United States Patent
Feng et al.

(10) Patent No.: US 11,119,018 B2
(45) Date of Patent: Sep. 14, 2021

(54) TRUE TRIAXIAL TESTING SYSTEM FOR DISTURBANCE EXPERIMENT WITH BROADBAND AND LOW AMPLITUDE OF HIGH PRESSURE HARD ROCK

(71) Applicant: Northeastern University, Shenyang (CN)

(72) Inventors: Xiating Feng, Shenyang (CN); Mian Tian, Shenyang (CN); Fengpeng Zhang, Shenyang (CN); Jun Tian, Shenyang (CN); Chengxiang Yang, Shenyang (CN); Jianyu Peng, Shenyang (CN); Yuemao Zhao, Shenyang (CN); Jikai Gao, Shenyang (CN); Jianqing Jiang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 17/059,169

(22) PCT Filed: Dec. 20, 2019

(86) PCT No.: PCT/CN2019/126887
§ 371 (c)(1),
(2) Date: Nov. 25, 2020

(87) PCT Pub. No.: WO2021/114369
PCT Pub. Date: Jun. 17, 2021

(65) Prior Publication Data
US 2021/0223151 A1    Jul. 22, 2021

(30) Foreign Application Priority Data
Dec. 10, 2019  (CN) .......................... 201911257770.3

(51) Int. Cl.
*G01N 3/12* (2006.01)
*G01N 3/36* (2006.01)

(52) U.S. Cl.
CPC ................. *G01N 3/12* (2013.01); *G01N 3/36* (2013.01); *G01N 2203/0005* (2013.01);
(Continued)

(58) Field of Classification Search
CPC .... G01N 3/12; G01N 3/36; G01N 2203/0005; G01N 2203/0019; G01N 2203/0048; G01N 2203/0256
See application file for complete search history.

(56) References Cited

U.S. PATENT DOCUMENTS

| | | |
|---|---|---|
| 5,025,668 A | 6/1991 | Sarda et al. |
| 7,320,242 B2 * | 1/2008 | Hoo Fatt .................. G01N 3/30 73/12.14 |

(Continued)

FOREIGN PATENT DOCUMENTS

| | | |
|---|---|---|
| CN | 105865907 A | 8/2016 |
| CN | 205719826 U | 11/2016 |

(Continued)

OTHER PUBLICATIONS

Kun, Du et al., "Development and Application of Rock True Triaxial Disturbance Induction Test System", Experimental Technology and Management, Dec. 31, 2014, vol. 31, Issue No. 2, 17 pages.

*Primary Examiner* — Jonathan M Dunlap
(74) *Attorney, Agent, or Firm* — Muncy, Geissler, Olds & Lowe, P.C.

(57) ABSTRACT

A true triaxial testing system for disturbance experiment with broadband and low amplitude of a high pressure hard rock includes a low-frequency disturbance true triaxial mechanism, a variable-frequency low-speed disturbance rod mechanism and a rapid single-side unloading type specimen (Continued)

box. The low-frequency disturbance true triaxial mechanism and the variable-frequency low-speed disturbance rod mechanism are distributed along a straight line. The low-frequency disturbance true triaxial mechanism is independently used or cooperates with the variable-frequency low-speed disturbance rod mechanism for use. The rapid single-side unloading type specimen box cooperates with the low-frequency disturbance true triaxial mechanism for use.

8 Claims, 10 Drawing Sheets

(52) U.S. Cl.
CPC ............... *G01N 2203/0019* (2013.01); *G01N 2203/0048* (2013.01); *G01N 2203/0256* (2013.01)

(56) References Cited

U.S. PATENT DOCUMENTS

| | | | |
|---|---|---|---|
| 9,410,874 B2 * | 8/2016 | He | G01N 3/24 |
| 9,880,081 B1 * | 1/2018 | Gupta | G01N 33/24 |
| 10,197,483 B2 * | 2/2019 | Du | G01N 3/24 |
| 10,324,014 B2 * | 6/2019 | Feng | G01N 3/307 |
| 10,697,281 B2 * | 6/2020 | Feng | E21B 43/26 |
| 2018/0275034 A1 * | 9/2018 | Feng | G01N 3/307 |
| 2019/0033198 A1 | 1/2019 | Atapour et al. | |
| 2019/0242228 A1 * | 8/2019 | Feng | F04B 51/00 |

FOREIGN PATENT DOCUMENTS

| | | |
|---|---|---|
| CN | 106198264 A | 12/2016 |
| CN | 106289995 A | 1/2017 |
| CN | 106840901 A | 6/2017 |
| CN | 107014690 A | 8/2017 |
| CN | 207730551 U | 8/2018 |

* cited by examiner

TRUE TRIAXIAL TESTING SYSTEM FOR DISTURBANCE EXPERIMENT WITH BROADBAND AND LOW AMPLITUDE OF HIGH PRESSURE HARD ROCK

BACKGROUND OF THE INVENTION

1. Field of the Invention

The present invention relates to a testing system for a high pressure hard rock, and more particularly to a true triaxial testing system for disturbance experiment with broadband and low amplitude of a high pressure hard rock.

2. The Prior Arts

In deep rock engineering, rock masses are in a three-way high stress state, but high static stress provides a stress basis for development and occurrence of deep rock engineering disasters. Besides, blasting excavation is always one of main methods of deep rock engineering excavation because of characteristics of high efficiency and good economy. Therefore, during the engineering construction period, the rock masses will be inevitably affected by disturbance waves caused by blasting. The disturbance waves caused by blasting can gradually attenuate to low-frequency blasting earthquake waves along with propagation attenuation. According to the existing literature, a frequency of the blasting earthquake waves is in a range of 0-20 Hz, and the magnitude of the blasting earthquake waves is in a range of 0.1-30 MPa. Although the frequency and the magnitude range of the blasting earthquake waves are small, the blasting earthquake waves can still trigger deep rock engineering disasters such as rock burst, zonal disintegration, disturbance type landslide and continuous cracking of rock masses. Field measurement data shows that in addition to the blasting earthquake waves, a frequency of disturbance waves caused by some large rock burst is also in a range of 0-20 Hz, and the magnitude is also in a range of 0.1-30 MPa. When such large rock burst occurs, secondary rock burst often occurs at places far away from large rock burst regions. In addition, according to literature research, fault slip, earthquake and other disturbance can also cause disturbance rock burst, and a frequency of the disturbance rock burst is also in a range of 0-20 Hz.

In view of the problem that rocks under high static stress load are subjected to low frequency disturbance load, relevant technical personnel have developed a series of rock disturbance true triaxial testing equipment, and although the testing equipment has the capacity of simulating the action process that the rocks under high static stress load are subjected to disturbance load from the angle of a disturbance mode being point disturbance or local disturbance, but there are still limitations. Because the disturbance load of each differential element in the field rock masses is applied to the whole surface of the differential elements, but existing equipment is generally limited by oil source flow and control performance, the disturbance power uses a manner of applying disturbance force by small oil cylinders, the disturbance power is not completely loaded onto the whole surfaces of specimens on the basis that static load is loaded to the specimens, and compared with a whole surface disturbance applying mode, the point disturbance and local disturbance applying method can make the test results not conform to the actual field. At the same time, the disturbance wave amplitude of the field acts in a positive and negative alternating manner, which means that the field stress is increased and decreased on the basis of static stress, that is, the field stress is loaded and unloaded on the basis of static stress. However, the existing equipment includes the structure of a single static load oil cylinder, a counterforce frame and a dynamic small oil cylinder in the same direction, the structure can only simulate a disturbance force loading process based on static load, but cannot simulate an unloading process based on the static stress.

In the construction process of deep rock engineering, because of the characteristics of being high in excavation efficiency and good in economy, blasting excavation is always one of the most main excavation modes at present. Mainly, blasting can be divided into three regions, including a blasting shock wave region, a blasting stress wave region and a blasting elastic wave region according to different stress characteristics produced by blasting. The stress amplitude of blasting shock waves exceeds the strength of the rock masses, so that the rock masses can be directly broken. The stress amplitude of blasting stress waves is lower than the strength of the rock masses, but the blasting stress waves can also cause continuous cracking of the rock masses and finally cause instability of the rock masses when repeatedly acting on the rock masses. At present, the blasting stress waves are researched mainly through field monitoring of a blasting vibration meter. The stress amplitude of blasting elastic waves is the lowest, so that the blasting elastic waves have the smallest influence on the rock masses. According to the existing research results, when deep rocks are subjected to blasting excavation, the main frequency range of the blasting stress waves is about 100 Hz-500 Hz, and the stress amplitude range of the blasting stress waves is about 0.1 MPa-30 MPa. From the viewpoint of strain rate, the strain rate of the blasting stress waves is in the middle range between the low strain rate of static stress and the medium-high strain rate of dynamic impact stress. At present, in indoor mechanical tests of rocks, the blasting shock waves can realize simulation through traditional Hopkinson bar test equipment, and the blasting elastic waves can realize simulation through existing low-frequency dynamic equipment. However, the simulation of the blasting stress waves has some problems as follows: firstly, when the traditional Hopkinson bar test equipment is used, requirements of low stress amplitude characteristics are difficult to meet; and secondly, when traditional hydraulic equipment is used, frequency characteristics are not achieved. In addition, to simulate the blasting stress waves, the length of the testing equipment cannot be too long, because if the testing equipment is too long, it is difficult to select testing sites, and the equipment is inconvenient to mount and maintain.

SUMMARY OF THE INVENTION

A primary objective of the present invention is to provide a true triaxial testing system for disturbance experiment with broadband and low amplitude of a high pressure hard rock, wherein the system can simulate the loading action process of surface disturbance having a frequency range being 0-20 Hz of blasting earthquake waves of rock masses under high static stress load, disturbance waves caused by large rock burst and disturbance waves caused by fault slip and the like from the viewpoint of indoor tests.

Another objective of the present invention is to provide a true triaxial testing system for disturbance experiment with broadband and low amplitude of a high pressure hard rock, wherein the system can realize simulation of low stress amplitude characteristics through low-speed shooting of a bullet.

Another objective of the present invention is to provide a true triaxial testing system for disturbance experiment with broadband and low amplitude of a high pressure hard rock, wherein the system can realize simulation of specific frequency characteristics with bars connected to each other, besides, the length of the equipment can also be effectively shortened with bars connected to each other, the floor space of the equipment is effectively saved, the difficulty in selecting testing sites is reduced, and the equipment is easier to mount and maintain.

To achieve the above objectives, the present invention provides a true triaxial testing system for disturbance experiment with broadband and low amplitude of a high pressure hard rock comprising a low-frequency disturbance true triaxial mechanism, a variable-frequency low-speed disturbance rod mechanism and a rapid single-side unloading type specimen box; wherein the low-frequency disturbance true triaxial mechanism and the variable-frequency low-speed disturbance rod mechanism are distributed on the same straight line, the low-frequency disturbance true triaxial mechanism is independently used or cooperates with the variable-frequency low-speed disturbance rod mechanism for use, and the rapid single-side unloading type specimen box cooperates with the low-frequency disturbance true triaxial mechanism for use.

The low-frequency disturbance true triaxial mechanism comprises a true triaxial loading assembly and a parallel oil source assembly; wherein the true triaxial loading assembly and the parallel oil source assembly are both mounted on a mechanism base; wherein the true triaxial loading assembly comprises a rigid base, a horizontal rigid framework body, a vertical rigid framework body, a cast iron vibration damping platform and six servo hydraulic dynamic actuators; wherein the cast iron vibration damping platform is horizontally and fixedly mounted on the mechanism base, the rigid base is horizontally clamped and mounted on the cast iron vibration damping platform, and the vertical rigid framework body is vertically screwed and fixed to an upper surface of the rigid base, and the vertical rigid framework body consists of a top plate, a bottom plate and four upright posts; wherein the horizontal rigid framework body is an annular structure, is sleeved on an outer side of the vertical rigid framework body, and is screwed and fixed to the upper surface of the rigid base; wherein two servo hydraulic dynamic actuators are respectively mounted on the top plate and the bottom plate of the vertical rigid framework body, and the two servo hydraulic dynamic actuators on the top plate and the bottom plate of the vertical rigid framework body are in symmetrical distribution; wherein four servo hydraulic dynamic actuators are uniformly distributed and mounted on the horizontal rigid framework body in a circumferential direction; and wherein a reversing valve block is assembled on each servo hydraulic dynamic actuator, a dynamic load sensor is assembled at one end of a piston rod of each servo hydraulic dynamic actuator, and the piston rod of each servo hydraulic dynamic actuator is a hollow rod structure.

The parallel oil source assembly comprises an oil tank, a pump station and coolers; wherein an inner cavity of the oil tank is divided into six regions by baffle plates, and the six regions are respectively defined as a No. 1 region, a No. 2 region, a No. 3 region, a No. 4 region, a No. 5 region and a No. 6 region; wherein a top part of the No. 1 region, a top part of the No. 2 region and a top part of the No. 3 region are in mutual communication, a top part of the No. 4 region and a top part of the No. 5 region are in mutual communication, a bottom part of the No. 5 region and a bottom part of the No. 6 region are in mutual communication, the top part of the No. 1 region and the top part of the No. 4 region are in mutual communication, the top part of the No. 2 region and the top part of the No. 5 region are in mutual communication, and the top part of the No. 3 region and a top part of the No. 6 region are in mutual communication; wherein the pump station comprises five hydraulic pumps which are respectively defined as a first high-flow hydraulic pump, a second high-flow hydraulic pump, a third high-flow hydraulic pump, a fourth high-flow hydraulic pump and a low-flow hydraulic pump; wherein a flow control valve is connected to a hydraulic oil output port of each of the five hydraulic pumps, the hydraulic oil output ports of the hydraulic pumps are connected to an oil inlet end of a flow dividing valve seat through pipelines, and a front and back cavity oil port of each servo hydraulic dynamic actuator is connected to an oil outlet end of the flow dividing valve seat through the corresponding reversing valve block and a corresponding pipeline; wherein hydraulic oil suction ports of the first high-flow hydraulic pump, the second high-flow hydraulic pump, the third high-flow hydraulic pump, the fourth high-flow hydraulic pump and the low-flow hydraulic pump communicate with a bottom part of the inner cavity of the oil tank through pipelines to be used for pumping hydraulic oil in the No. 1 region, the No. 2 region and the No. 3 region; wherein overflow valves are respectively mounted between the hydraulic oil output ports of the first high-flow hydraulic pump, the second high-flow hydraulic pump, the third high-flow hydraulic pump, the fourth high-flow hydraulic pump and the low-flow hydraulic pump and the flow control valves respectively corresponding to the hydraulic oil output ports, and overflow ports of the overflow valves communicate with the No. 4 region, the No. 5 region and the No. 6 region through overflow pipelines; wherein the first high-flow hydraulic pump, the second high-flow hydraulic pump, the third high-flow hydraulic pump and the fourth high-flow hydraulic pump are connected to an oil inlet end of an oil return valve seat through pipelines, and an oil outlet end of the oil return valve seat communicates with the No. 4 region through a pipeline; wherein when the first high-flow hydraulic pump, the second high-flow hydraulic pump, the third high-flow hydraulic pump and the fourth high-flow hydraulic pump are subjected to dynamic disturbance, hydraulic oil flows to the oil inlet end of the oil return valve seat through pipelines; and hot oil output pipelines are connected to the bottom part of the No. 5 region, a hot oil hydraulic pump is connected to an oil outlet of each hot oil output pipeline, an oil outlet of each hot oil hydraulic pump communicates with the corresponding cooler through a pipeline, hot oil in the No. 5 region is pumped by the hot oil hydraulic pumps into the coolers for temperature reduction, and an oil outlet of each cooler communicates with the bottom part of the No. 6 region through a cold oil return pipeline.

The variable-frequency low-speed disturbance rod mechanism comprises a launch platform, an air cylinder, a gun barrel, a bullet and an incident rod; wherein the gun barrel is horizontally erected on a back side of the launch platform, the air cylinder is mounted at a back part of the gun barrel, the bullet is located in the gun barrel, and a polyethylene antifriction sleeve is sleeved on the bullet in the gun barrel; wherein the incident rod is horizontally erected on a front side of the launch platform through an incident rod support seat; wherein the bullet and the incident rod have two cooperation manners: in a first cooperation manner, the bullet and the incident rod are separately arranged, a polyvinylidene fluoride (PVDF) piezoelectric film sensor is mounted on a front end surface of a rod body of the incident rod, the front end surface of the rod body of the incident rod is abutted against and in contact with rock specimens through the polyvinylidene fluoride (PVDF) piezoelectric film sensor, and a shaping slice is mounted on a back end surface of the rod body of the incident rod; in a second cooperation manner, a front end surface of the bullet and the back end surface of the rod body of the incident rod are abutted against and in contact with each other, so that the bullet and the incident rod form a lengthened type bullet, a splicing casing pipe is sleeved outside a junction of the bullet and the incident rod, the splicing casing pipe can move axially relative to the bullet and the incident rod, the front end surface of the rod body of the incident rod and the rock specimens are mutually separately arranged, the shaping slice is mounted on the front end surface of the rod body of the incident rod, and the polyvinylidene fluoride (PVDF) piezoelectric film sensor is mounted on an external surface of the shaping slice; wherein a single pulse mass block is sleeved outside the rod body of the incident rod and is a split combined type structure, an annular groove is formed in a hole wall in an incident rod penetrating and mounting hole of the single pulse mass block, an annular boss is arranged on the rod body of the incident rod and is located in the annular groove, and an axial thickness of the annular boss is smaller than an axial width of the annular groove, so that an incident rod axial fine motion clearance is formed between the annular boss and the annular groove; and wherein a slide rail is mounted on the launch platform under the single pulse mass block, is a parallel double-rail structure, and is parallel to the incident rod, a slide block is arranged on the slide rail and is horizontally and fixedly connected to a slide platform, and the single pulse mass block is fixedly connected to an upper surface of the slide platform and can move linearly relative to the slide rail.

An air compressor and a control console are arranged on a ground at a lateral side of the launch platform, a first button switch and a second button switch are arranged on the control console, and an air bottle, a first pneumatic control valve and a second pneumatic control valve are arranged in the launch platform under the gun barrel; wherein the air cylinder is horizontally arranged, a front chamber and a back chamber are arranged in the air cylinder, a piston rod of the air cylinder penetrates through a baffle plate between the front chamber of the air cylinder and the back chamber of the air cylinder in a sealed manner, a gun barrel sealing plug is mounted at an end part of the piston rod of the air cylinder located in the front chamber of the air cylinder, a launch air outlet is formed in an axial cylinder wall of the front chamber of the air cylinder, an air inlet end pipe port at a back part of the gun barrel is in communication with the launch air outlet in a sealed manner, and a launch air inlet is formed in a radial cylinder wall of the front chamber of the air cylinder, and is in communication with an air outlet of the air bottle through a launch air inlet pipe in a sealed manner; wherein a piston disc is mounted at an end of the piston rod of the air cylinder located in the back chamber of the air cylinder and divides the back chamber of the air cylinder into a rod cavity and a rodless cavity, and a diameter of the piston disc is greater than that of the gun barrel sealing plug; wherein the first button switch and the second button switch have the same structure and both comprises an air inlet, a normally open air outlet, a normally closed air outlet and a pressure relief port; wherein the pressure relief port directly communicates with atmosphere; wherein an air supply port of the air compressor performs output in three paths which are defined as a first path, a second path and a third path, the first path of the air supply port communicates with the air inlet of the first button switch, the second path of the air supply port communicates with an air inlet of the first pneumatic control valve, and the third path of the air supply port communicates with an air inlet of the air bottle; wherein the normally open air outlet of the first button switch communicates with the rodless cavity of the back chamber of the air cylinder, the normally closed air outlet of the first button switch communicates with the air inlet of the second button switch, the normally open air outlet of the second button switch performs output in two paths which are defined as a first path and a second path, the first path of the normally open air outlet of the second button switch communicates with a valve closing pneumatic control port of the first pneumatic control valve, and the second path of the normally open air outlet of the second button switch communicates with a valve opening pneumatic control port of the second pneumatic control valve; wherein the normally closed air outlet of the second button switch performs output in two paths which are defined as a first path and a second path, the first path of the normally closed air outlet of the second button switch communicates with a valve opening pneumatic control port of the first pneumatic control valve, and the second path of the normally closed air outlet of the second button switch communicates with a valve closing pneumatic control port of the second pneumatic control valve; wherein an air outlet of the first pneumatic control valve performs output in two paths which are defined as a first path and a second path, the first path of the air outlet of the first pneumatic control valve communicates with an air inlet of the second pneumatic control valve, and the second path of the air outlet of the first pneumatic control valve communicates with the rod cavity of the back chamber of the air cylinder; and wherein an air outlet of the second pneumatic control valve communicates with atmosphere.

A vacuum pump is arranged on the ground at the lateral side of the launch platform, air exhaust ports are formed in a back-end pipe body of the gun barrel and a middle pipe body of the splicing casing pipe, the two air exhaust ports are both connected with the vacuum pump, a pipe cavity of the gun barrel and a pipe cavity of the splicing casing pipe are vacuumized through the vacuum pump; wherein through vacuumizing, the bullet in the gun barrel can automatically retreat to a launch position under an action of negative pressure, and through vacuumizing, the bullet in the splicing casing pipe and the incident rod are automatically abutted against and in contact with each other; wherein a bullet velometer is mounted on the launch platform adjacent to an outlet of the gun barrel, and an incident rod velometer is mounted on the launch platform on a front side of the single pulse mass block; wherein a charge amplifier is arranged on the ground at the lateral side of the launch platform, a signal output end of the polyvinylidene fluoride (PVDF) piezoelectric film sensor is connected with the charge amplifier, and a voltage signal of the charge amplifier is connected to an oscillograph or a computer; wherein an incident rod bearing platform is mounted at the lateral side of the launch platform, and the incident rod which is not used temporarily is placed on the incident rod bearing platform; and wherein a gantry crane is arranged above the launch platform, and the incident rod is mounted and disassembled through the gantry crane.

The rapid single-side unloading type specimen box comprises a framework, a framework transfer trolley, a specimen limiting box, a first maximum principal stress direction support and force transmission assembly, a second maximum principal stress direction support and force transmission assembly, a first middle principal stress direction support and force transmission assembly, a second middle principal stress direction support and force transmission assembly, a first minimum principal stress direction support and force transmission assembly, a second minimum principal stress direction support and force transmission assembly, a maximum principal stress direction specimen deformation measurement assembly, a middle principal stress direction specimen deformation measurement assembly, a minimum principal stress direction specimen deformation measurement assembly and a pneumatic rapid unloading assembly; wherein the framework is a square structure and is placed on the framework transfer trolley; wherein the specimen limiting box is located in a center in the framework; wherein the first maximum principal stress direction support and force transmission assembly is arranged in a center of a front wall plate of the framework, the second maximum principal stress direction support and force transmission assembly is arranged in a center of a back wall plate of the framework, and the first maximum principal stress direction support and force transmission assembly and the second maximum principal stress direction support and force transmission assembly are distributed along the same horizontal straight line; wherein the first middle principal stress direction support and force transmission assembly is arranged in a center of a top wall plate of the framework, the second middle principal stress direction support and force transmission assembly is arranged in a center of a bottom wall plate of the framework, and the first middle principal stress direction support and force transmission assembly and the second middle principal stress direction support and force transmission assembly are distributed along the same vertical straight line; wherein the first minimum principal stress direction support and force transmission assembly is arranged in a center of a left wall plate of the framework, the second minimum principal stress direction support and force transmission assembly is arranged in a center of a right wall plate of the framework, and the first minimum principal stress direction support and force transmission assembly and the second minimum principal stress direction support and force transmission assembly are distributed along the same horizontal straight line; wherein the maximum principal stress direction specimen deformation measurement assembly is assembled between the first maximum principal stress direction support and force transmission assembly and the second maximum principal stress direction support and force transmission assembly; wherein the middle principal stress direction specimen deformation measurement assembly is assembled between the first middle principal stress direction support and force transmission assembly and the second middle principal stress direction support and force transmission assembly; wherein the minimum principal stress direction specimen deformation measurement assembly is assembled between the first minimum principal stress direction support and force transmission assembly and the second minimum principal stress direction support and force transmission assembly; and wherein the pneumatic rapid unloading assembly is assembled between the first minimum principal stress direction support and force transmission assembly and the framework.

The specimen limiting box is a rectangular structure and consists of upper and lower half boxes, and the upper and lower half boxes are buckled together to form the complete specimen limiting box, and are fixedly connected through bolts; wherein pressure head passing through holes are respectively formed in six wall surfaces of the specimen limiting box; wherein the first maximum principal stress direction support and force transmission assembly, the second maximum principal stress direction support and force transmission assembly, the first middle principal stress direction support and force transmission assembly and the second minimum principal stress direction support and force transmission assembly have the same structure and all comprises a disc-shaped bearing cushion block, a cylindrical bearing cushion block and a square pressure head; wherein the disc-shaped bearing cushion blocks are located outside a wall plate of the framework, guide lug plates are uniformly distributed and fixedly arranged on a circumferential edge of each disc-shaped bearing cushion block, a guide light hole is formed in each guide lug plate, a guide stud is mounted in each guide light hole in a penetrating manner and is fixedly connected to the wall plate of the framework, and the disc-shaped bearing cushion blocks can only move axially relative to the guide studs; wherein round cushion block passing through holes are formed in a center of the wall plate of the framework, each cylindrical bearing cushion block is mounted in the corresponding round cushion block passing through hole in a penetrating manner, a cushion block radial limiting ring and a cushion block antifriction bearing are sequentially arranged between each round cushion block passing through hole and the corresponding cylindrical bearing cushion block, a dustproof loop is sleeved on each cylindrical bearing cushion block on an inner side of the wall plate of the framework, and each dustproof loop is fixedly connected to the corresponding cushion block radial limiting ring through a corresponding dustproof loop limiting ring; wherein one end of each cylindrical bearing cushion block is abutted against and in contact with the corresponding disc-shaped bearing cushion block, the other end of each cylindrical bearing cushion block is abutted against and in contact with one end of the corresponding square pressure head, each square pressure head is mounted in the corresponding pressure head passing through hole corresponding to the specimen limiting box in a penetrating manner, and the other end of each square pressure head is abutted against and in contact with specimens in the specimen limiting box; wherein the second middle principal stress direction support and force transmission assembly comprises a disc-shaped bearing cushion block, a cushion block support limiting plate, a T-shaped bearing cushion block, a transition cushion block and a square pressure head; wherein the disc-shaped bearing cushion block of the second middle principal stress direction support and force transmission assembly is located under the bottom wall plate of the framework, a square cushion block passing through hole is formed in a center of the bottom wall plate of the framework, a small head end of the T-shaped bearing cushion block is mounted in the square cushion block passing through hole in a penetrating manner, the disc-shaped bearing cushion block of the second middle principal stress direction support and force transmission assembly is fixedly connected to the small head end of the T-shaped bearing cushion block, a large head end of the T-shaped bearing cushion block is located above the bottom wall plate of the framework, the cushion block support limiting plate is fixedly mounted on an upper surface of the bottom wall plate of the framework, the square cushion block passing through hole is also formed in a center of the cushion block support limiting plate, and a cushion block antifriction strip is arranged between the square cushion block passing through hole and the small head end of the T-shaped bearing cushion block; wherein the transition cushion block is placed at a top part of the large head end of the T-shaped bearing cushion block, and minimum principal stress direction transition cushion block guide limiting strips are arranged at the top part of the large head end of the T-shaped bearing cushion block; wherein a lower end of the square pressure head of the second middle principal stress direction support and force transmission assembly is abutted against and in contact with an upper surface of the transition cushion block, the square pressure head of the second middle principal stress direction support and force transmission assembly is mounted in the pressure head passing through hole under the specimen limiting box in a penetrating manner, and an upper end of the square pressure head of the second middle principal stress direction support and force transmission assembly is abutted against and in contact with the specimens in the specimen limiting box; and wherein maximum principal stress direction square pressure head guide limiting strips are arranged on the upper surface of the transition cushion block.

The first minimum principal stress direction support and force transmission assembly comprises a bearing cushion block for unloading, a square pressure head and a protective hood; wherein the protective hood takes the place of the wall plate of the framework, a bearing cushion block passing through and avoiding hole for unloading is formed in a middle part of the protective hood, and the bearing cushion block for unloading is mounted in the bearing cushion block passing through and avoiding hole for unloading in a penetrating manner; wherein one end of the square pressure head of the first minimum principal stress direction support and force transmission assembly is abutted against and in contact with one end of the bearing cushion block for unloading, the square pressure head of the first minimum principal stress direction support and force transmission assembly is mounted in the pressure head passing through hole corresponding to the specimen limiting box in a penetrating manner, and the other end of the square pressure head of the first minimum principal stress direction support and force transmission assembly is abutted against and in contact with the specimens in the specimen limiting box; wherein the maximum principal stress direction specimen deformation measurement assembly comprises maximum principal stress direction sensor brackets, a maximum principal stress direction guide rod and a maximum principal stress direction stretching displacement sensor; wherein the maximum principal stress direction sensor brackets are respectively and fixedly mounted on the two square pressure heads in a maximum principal stress direction, and the maximum principal stress direction guide rod and the maximum principal stress direction stretching displacement sensor are mounted between the two maximum principal stress direction sensor brackets in parallel; wherein the middle principal stress direction specimen deformation measurement assembly comprises middle principal stress direction sensor brackets, a middle principal stress direction guide rod and a middle principal stress direction stretching displacement sensor; wherein the middle principal stress direction sensor brackets are respectively and fixedly mounted on the two square pressure heads in a middle principal stress direction, and the middle principal stress direction guide rod and the middle principal stress direction stretching displacement sensor are mounted between the two middle principal stress direction sensor brackets in parallel; and wherein the minimum principal stress direction specimen deformation measurement assembly comprises minimum principal stress direction sensor brackets and a minimum principal stress direction stretching displacement sensor; wherein the minimum principal stress direction sensor brackets are fixedly mounted on the two square pressure heads in a minimum principal stress direction, and the minimum principal stress direction stretching displacement sensor is mounted between the two minimum principal stress direction sensor brackets.

The pneumatic rapid unloading assembly comprises two double-action air cylinders, two force transmitting brackets, a buffer block, a buffer spring and a buffer base; wherein the two double-action air cylinders are symmetrically distributed on two sides of the bearing cushion block for unloading; wherein the double-action air cylinders are vertically arranged, piston rods of the double-action air cylinders are upwards, end parts of the piston rods of the double-action air cylinders are respectively hinged to the force transmitting brackets, the force transmitting brackets are fixedly connected to the bearing cushion block for unloading, and cylinder barrel end parts of the double-action air cylinders are connected to the framework through hinge lug seats; wherein the buffer base is located just below the bearing cushion block for unloading, the buffer spring is vertically mounted on an upper surface of the buffer base, and the buffer block is mounted at a top part of the buffer spring; and wherein a guide pin is vertically arranged between the buffer block and the buffer base.

The true triaxial testing system for disturbance experiment with broadband and low amplitude of a high pressure hard rock of the present invention has the beneficial effects:

Firstly, the true triaxial testing system for disturbance experiment with broadband and low amplitude of a high pressure hard rock can simulate the loading action process of surface disturbance having a frequency range being 0-20 Hz of blasting earthquake waves of rock masses under high static stress load, disturbance waves caused by large rock burst and disturbance waves caused by fault slip and the like from the viewpoint of indoor tests.

Further, the true triaxial testing system for disturbance experiment with broadband and low amplitude of a high pressure hard rock can realize simulation of low stress amplitude characteristics through low-speed shooting of a bullet.

In addition, the true triaxial testing system for disturbance experiment with broadband and low amplitude of a high pressure hard rock can realize simulation of specific frequency characteristics with bars connected to each other, besides, the length of the equipment can also be effectively shortened with bars connected to each other, the floor space of the equipment is effectively saved, the difficulty in selecting testing sites is reduced, and the equipment is easier to mount and maintain.

DETAILED DESCRIPTION OF THE PREFERRED EMBODIMENT

The following is a detailed description of a true triaxial testing system for disturbance experiment with broadband and low amplitude of a high pressure hard rock of the present invention in combination with the drawings and specific embodiments.

Figure 1:
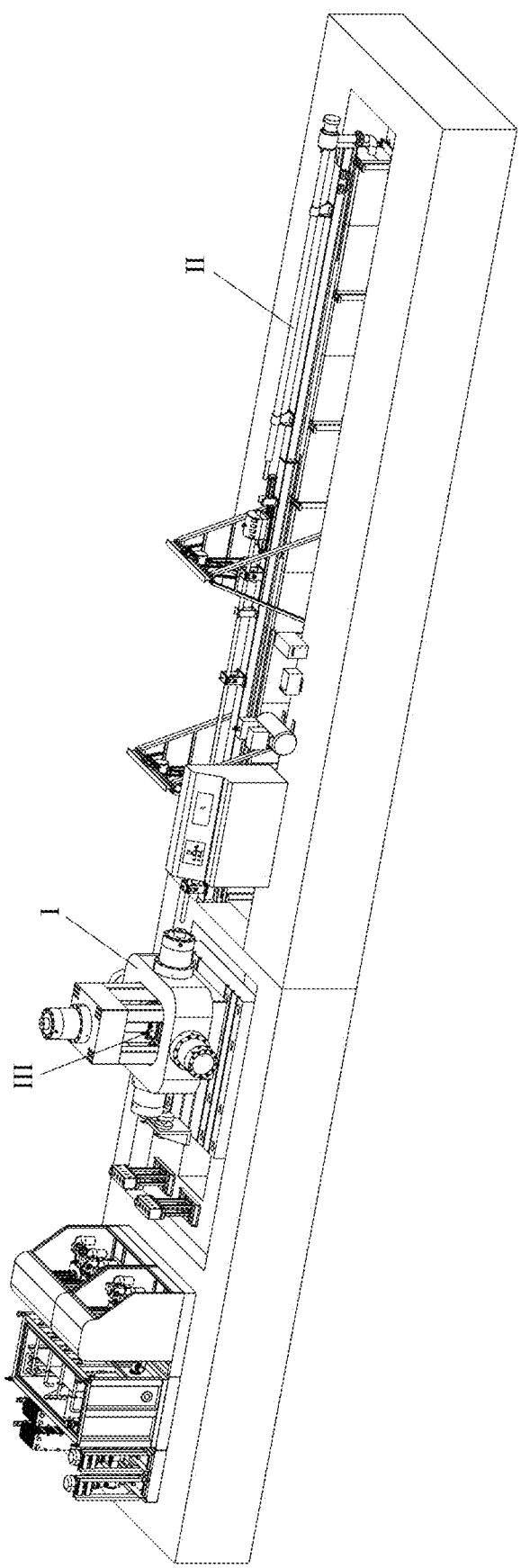
FIG. 1 shows a structural diagram of a true triaxial testing system for disturbance experiment with broadband and low amplitude of a high pressure hard rock of the present invention.

As shown in FIG. 1, the present invention provides a true triaxial testing system for disturbance experiment with broadband and low amplitude of a high pressure hard rock comprising a low-frequency disturbance true triaxial mechanism I, a variable-frequency low-speed disturbance rod mechanism II and a rapid single-side unloading type specimen box III. The low-frequency disturbance true triaxial mechanism I and the variable-frequency low-speed disturbance rod mechanism II are distributed on the same straight line, the low-frequency disturbance true triaxial mechanism I is independently used or cooperates with the variable-frequency low-speed disturbance rod mechanism II for use, and the rapid single-side unloading type specimen box III cooperates with the low-frequency disturbance true triaxial mechanism I for use.

Figure 2:
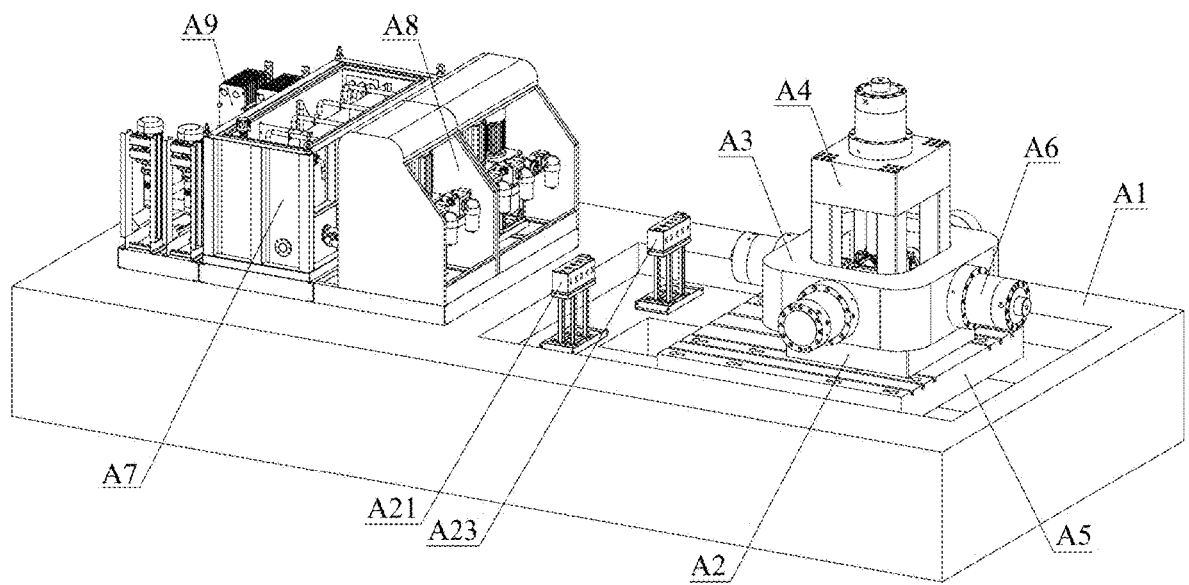
FIG. 2 shows a structural diagram of a low-frequency disturbance true triaxial mechanism of the present invention.
Figure 3:
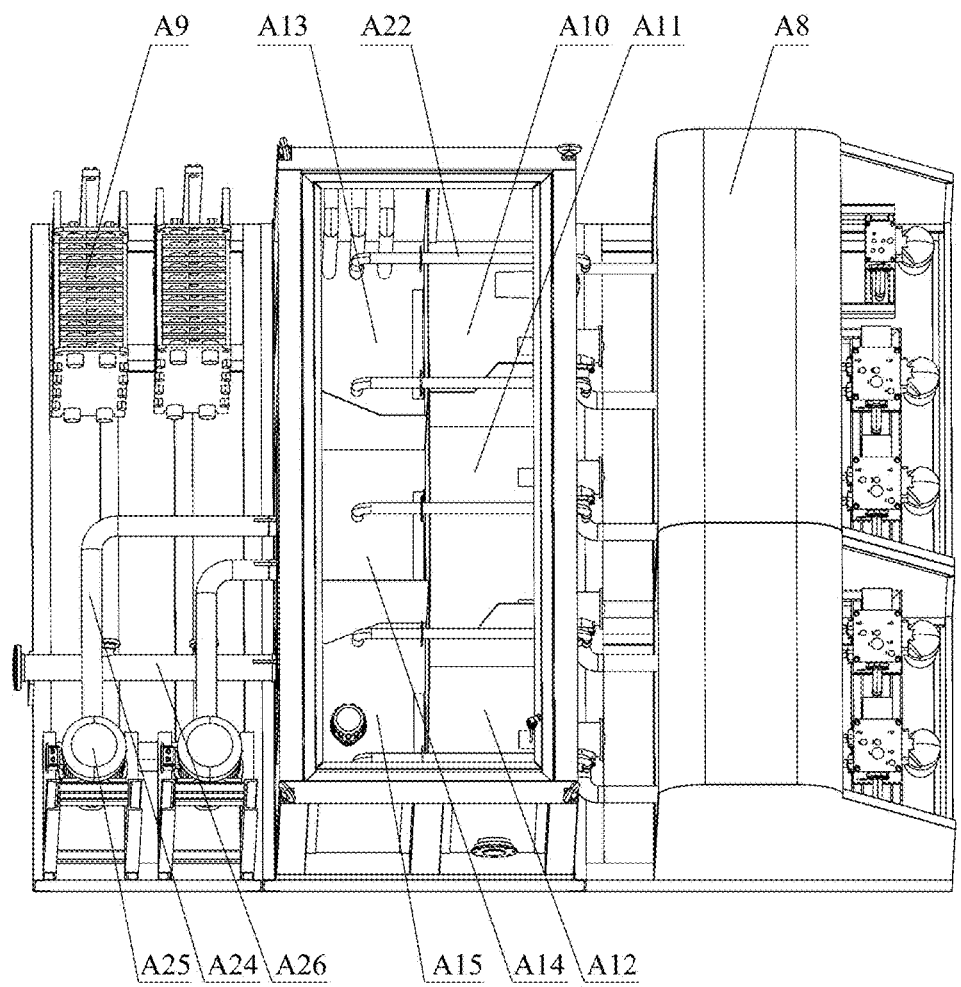
FIG. 3 shows a structural diagram of a parallel oil source assembly of the present invention in a first perspective.
Figure 4:
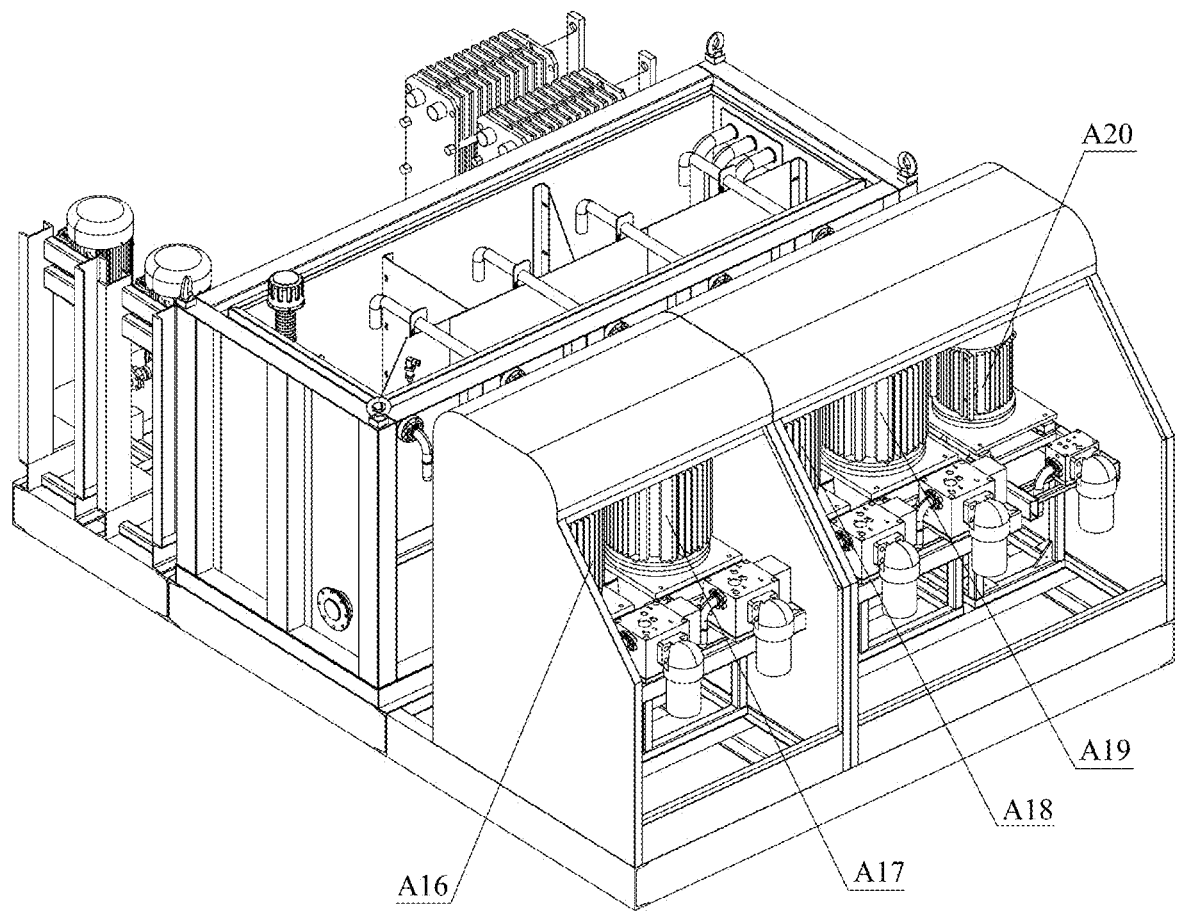
FIG. 4 shows a structural diagram of the parallel oil source assembly of the present invention in a second perspective.
Figure 5:
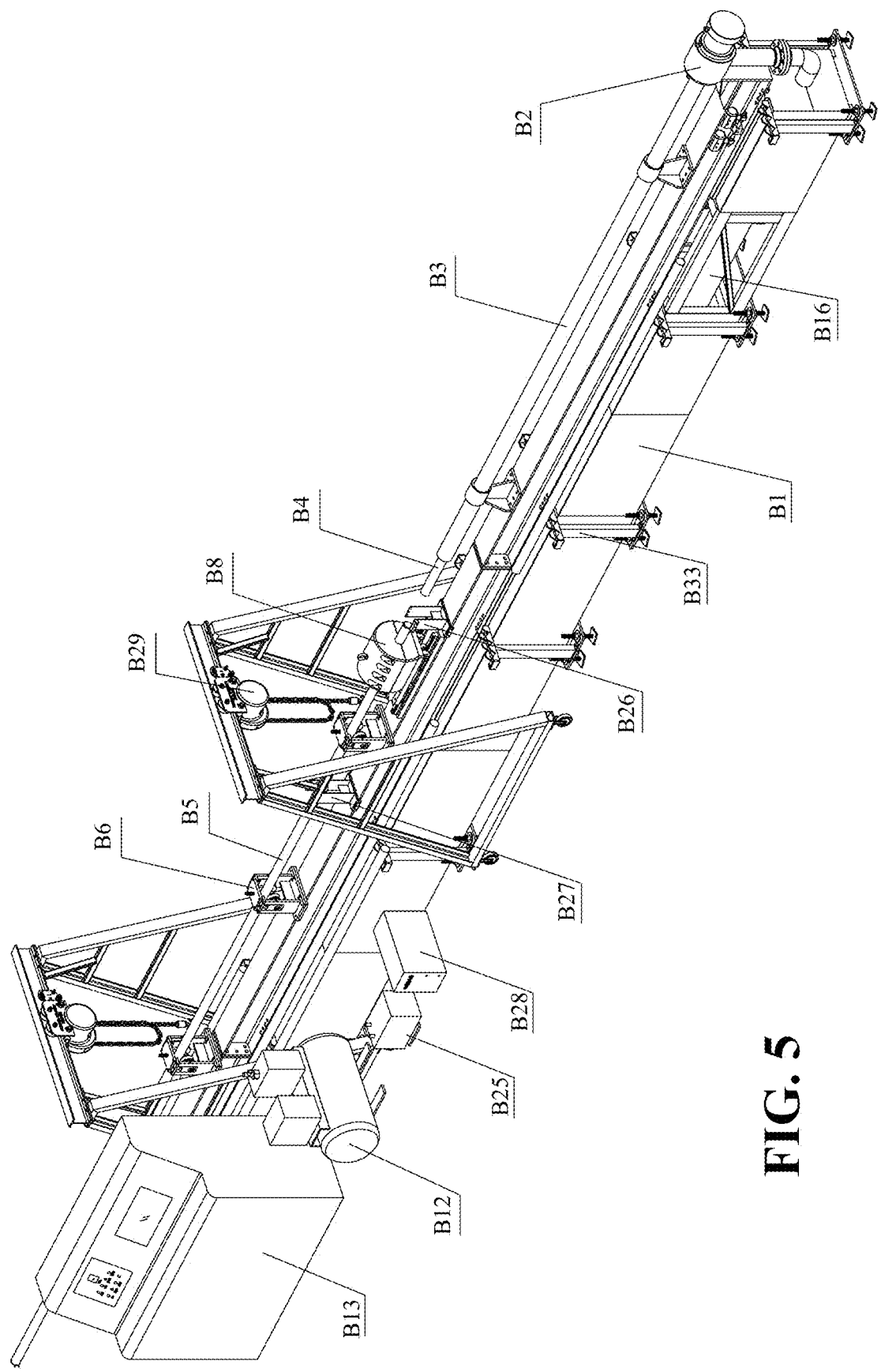
FIG. 5 shows a structural diagram of a variable-frequency low-speed disturbance rod mechanism of the present invention, wherein in a first cooperation manner, a bullet and an incident rod are mutually and separately arranged.
Figure 6:
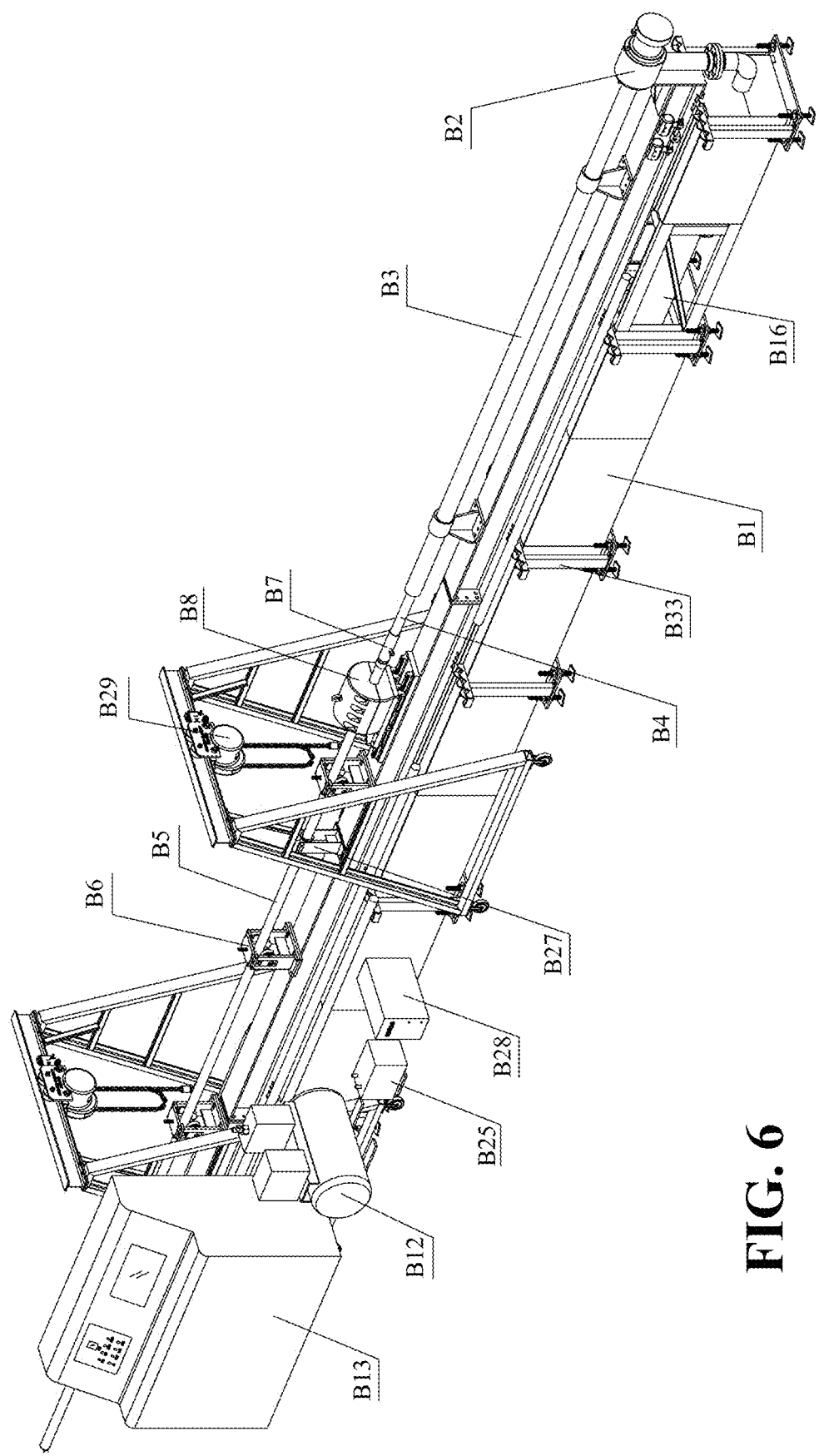
FIG. 6 shows the structural diagram of the variable-frequency low-speed disturbance rod mechanism of the present invention, wherein in a second cooperation manner, the bullet and the incident rod form a lengthened bullet.
Figure 7:
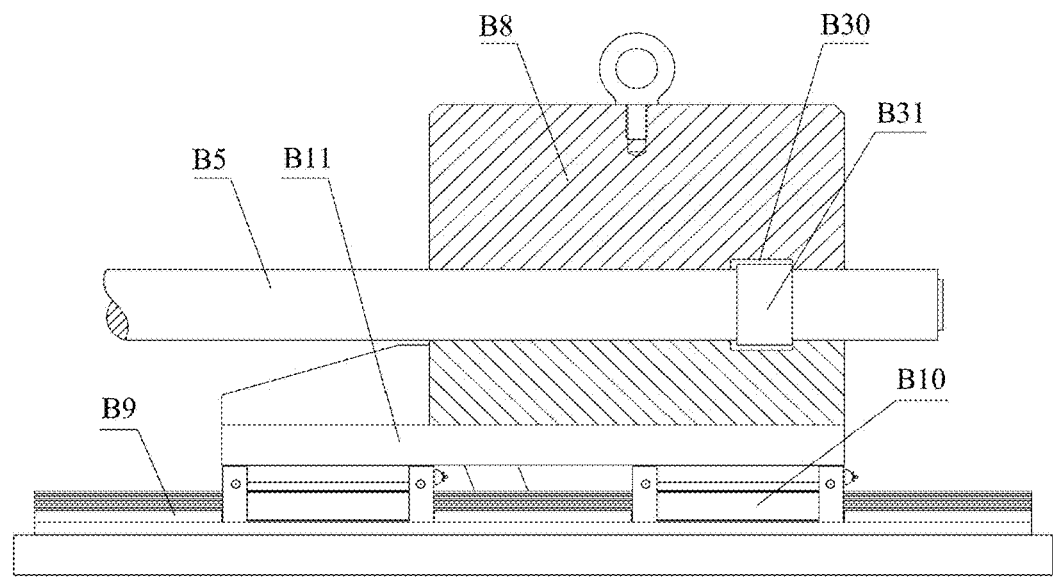
FIG. 7 shows assembling schematic diagrams of a single pulse mass block, an incident rod, a slide rail, a slide block and a slide platform of the present invention.
Figure 8:
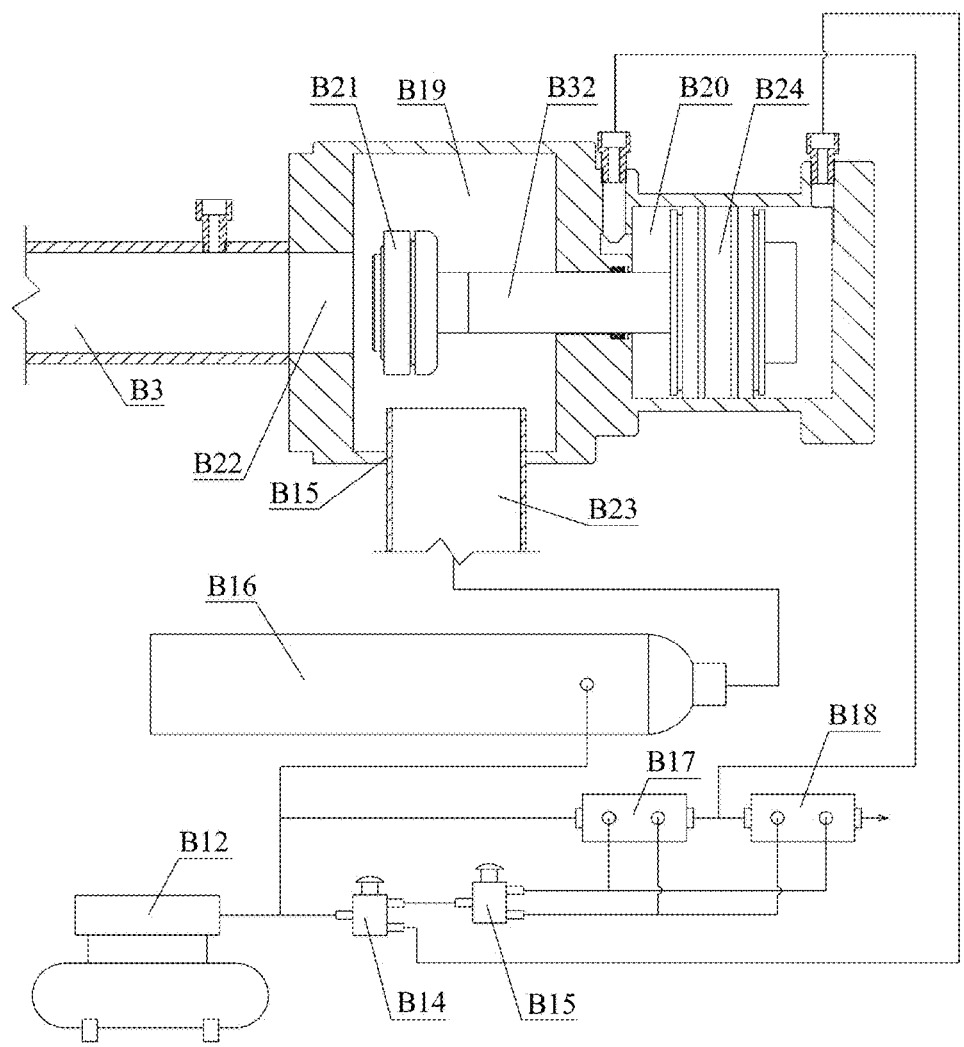
FIG. 8 shows an air path connection schematic diagram of an air cylinder, a first button switch, a second button switch, an air bottle, a first pneumatic control valve and a second pneumatic control valve of the present invention.
Figure 9:
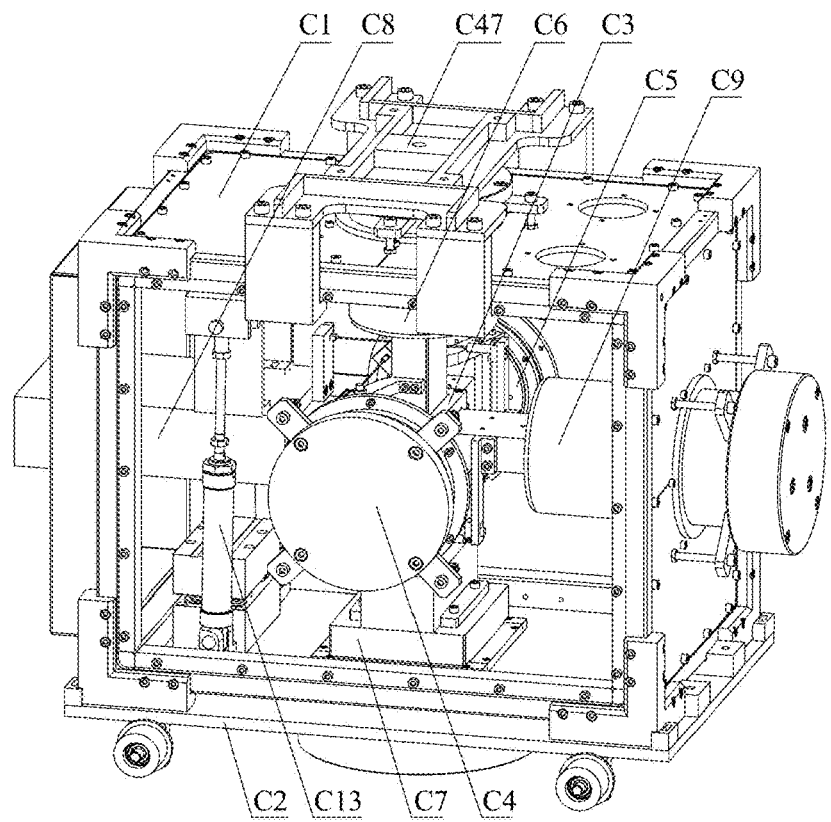
FIG. 9 shows a structural diagram of a rapid single-side unloading type specimen box, wherein a front wall plate of a framework is not shown under the first perspective.
Figure 10:
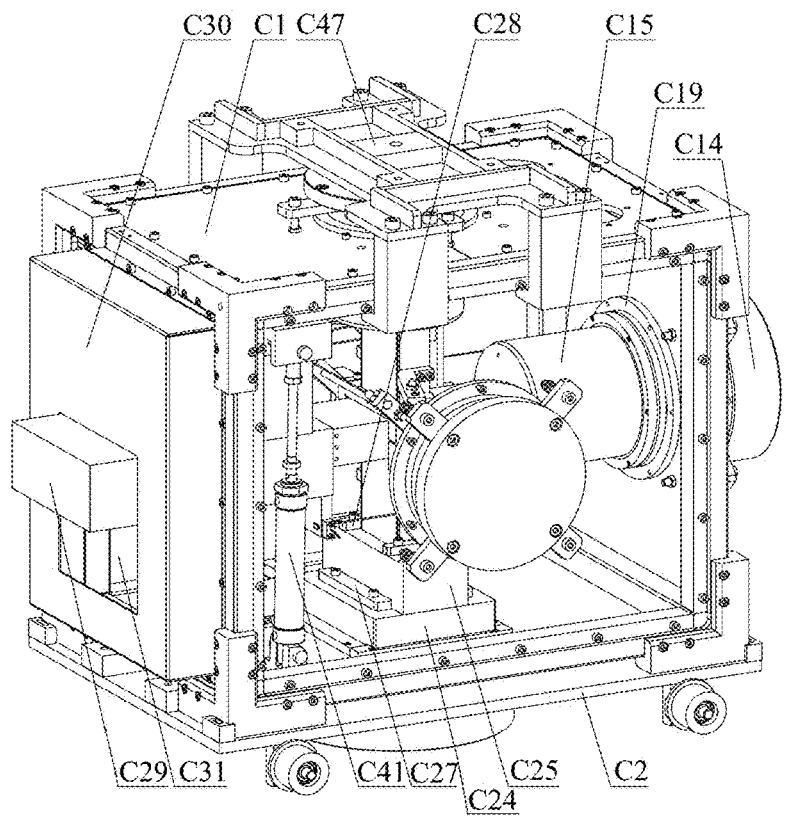
FIG. 10 shows a structural diagram of the rapid single-side unloading type specimen box of the present invention, wherein the front wall plate of the framework is not shown under the second perspective.
Figure 11:
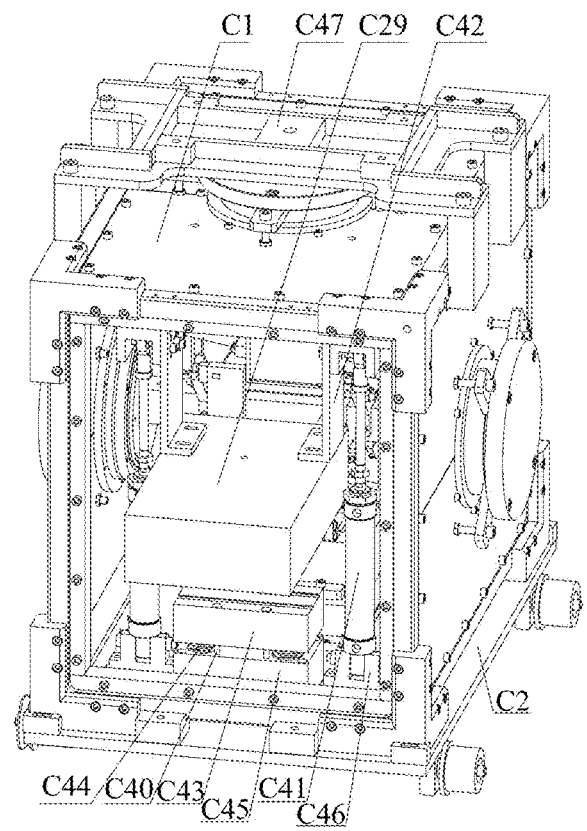
FIG. 11 shows a structural diagram of the rapid single-side unloading type specimen box of the present invention, wherein a protective hood is not shown under a third perspective.
Figure 12:
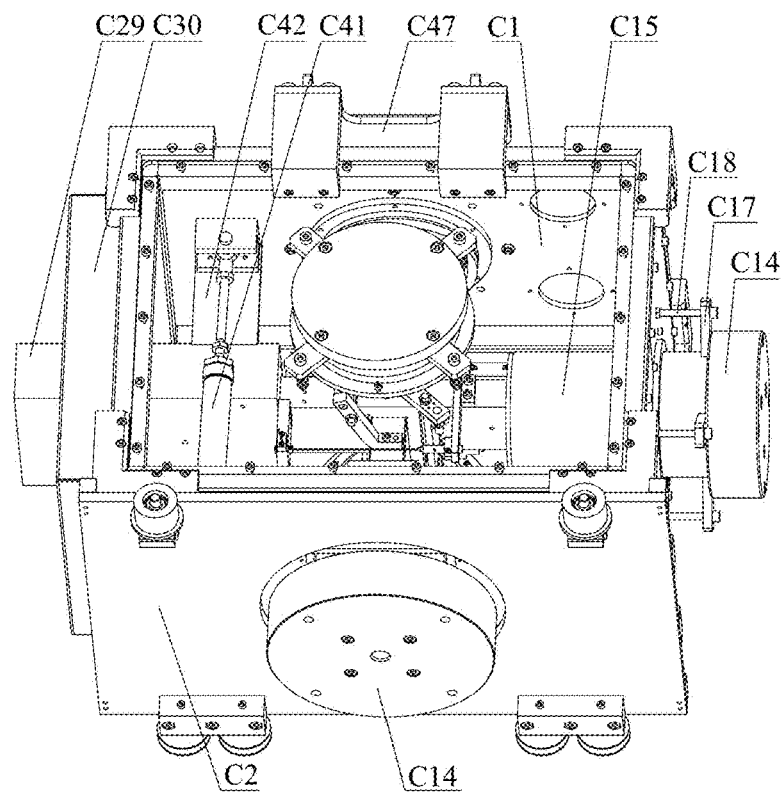
FIG. 12 shows a structural diagram of the rapid single-side unloading type specimen box of the present invention, wherein the front wall plate of the framework is not shown under a fourth perspective.
Figure 13:
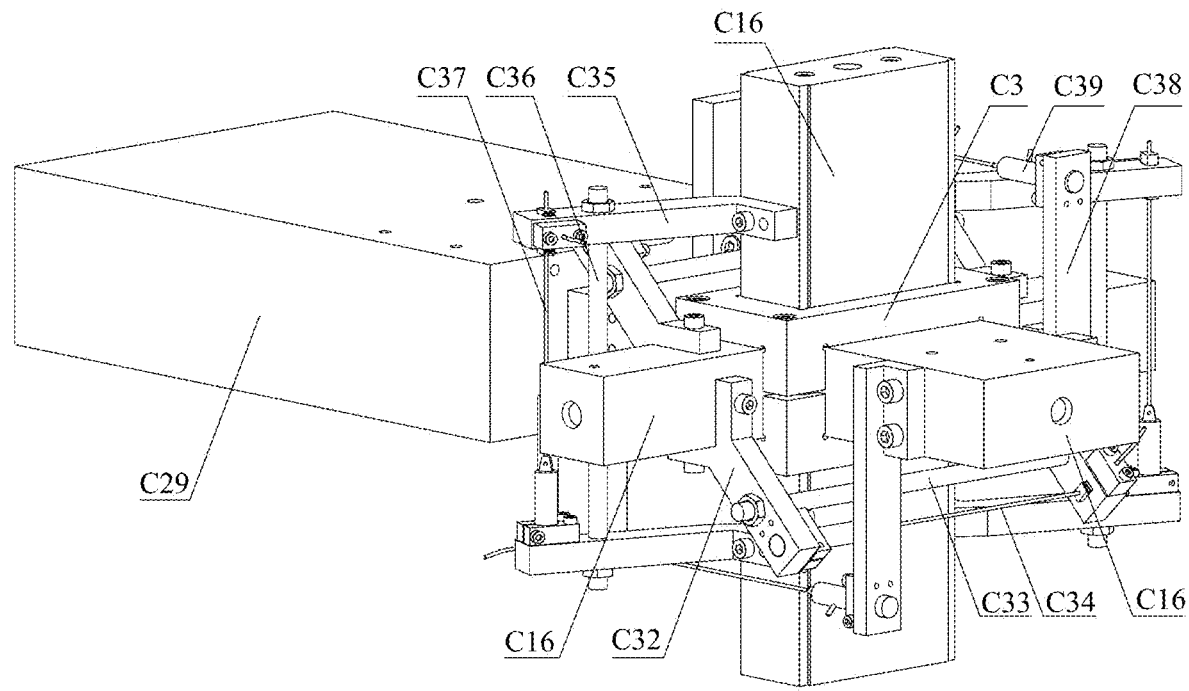
FIG. 13 shows an assembling schematic diagram between a specimen limiting box, square pressure heads, a maximum/middle/minimum principal stress direction specimen deformation measurement assembly and a bearing cushion block for unloading of the present invention.
Figure 14:
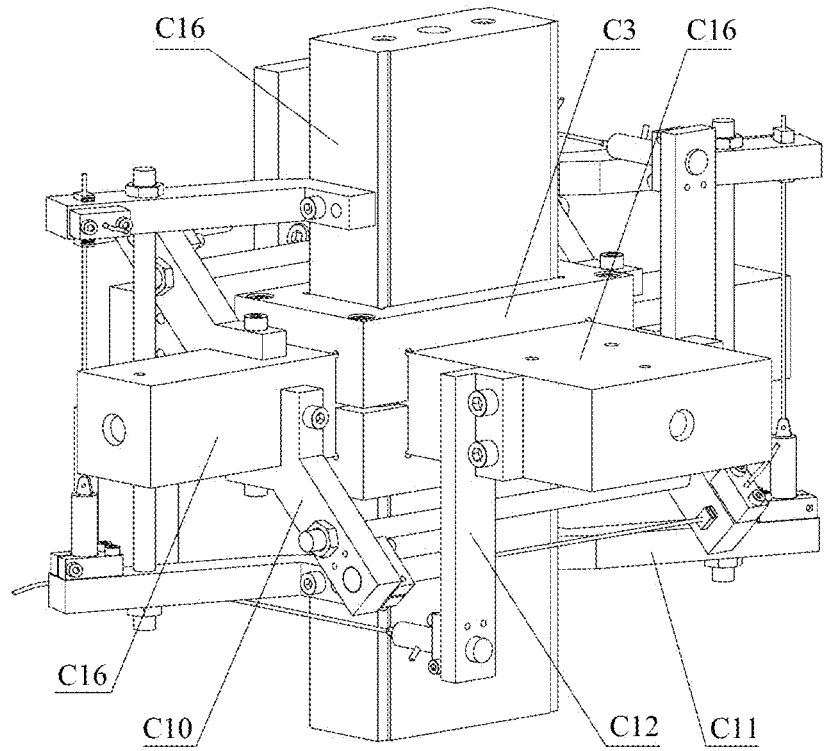
FIG. 14 shows an assembling schematic diagram between the specimen limiting box, the square pressure heads and the maximum/middle/minimum principal stress direction specimen deformation measurement assembly of the present invention.
Figure 15:
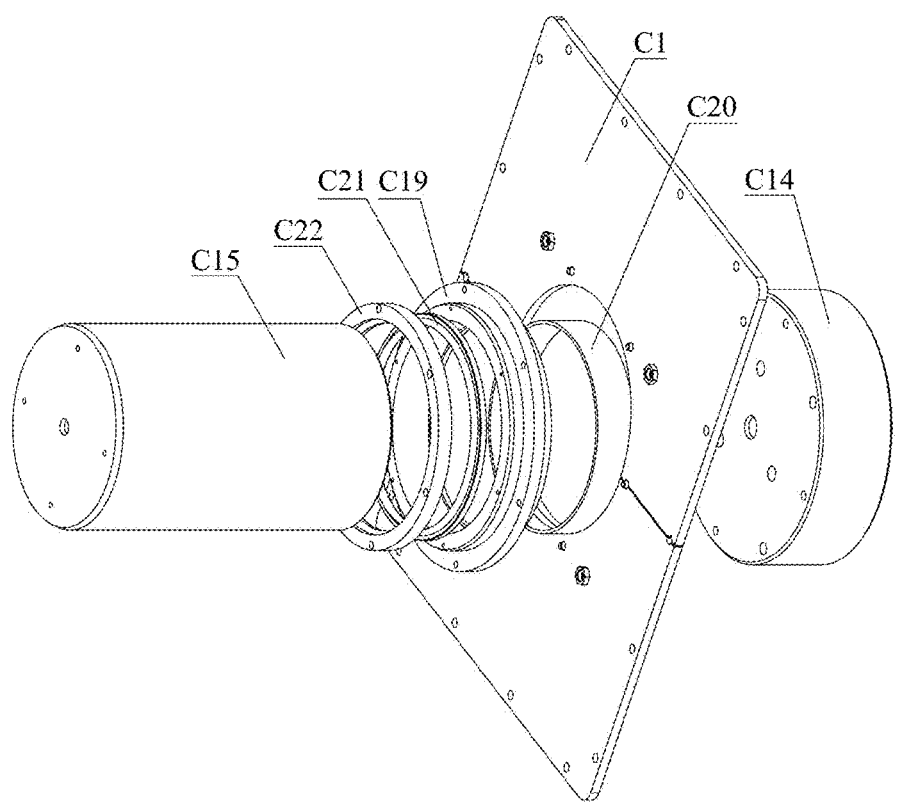
FIG. 15 shows an explosive diagram of a first maximum/second maximum/first middle/second minimum principal stress direction support and force transmission assembly of the present invention.
Figure 16:
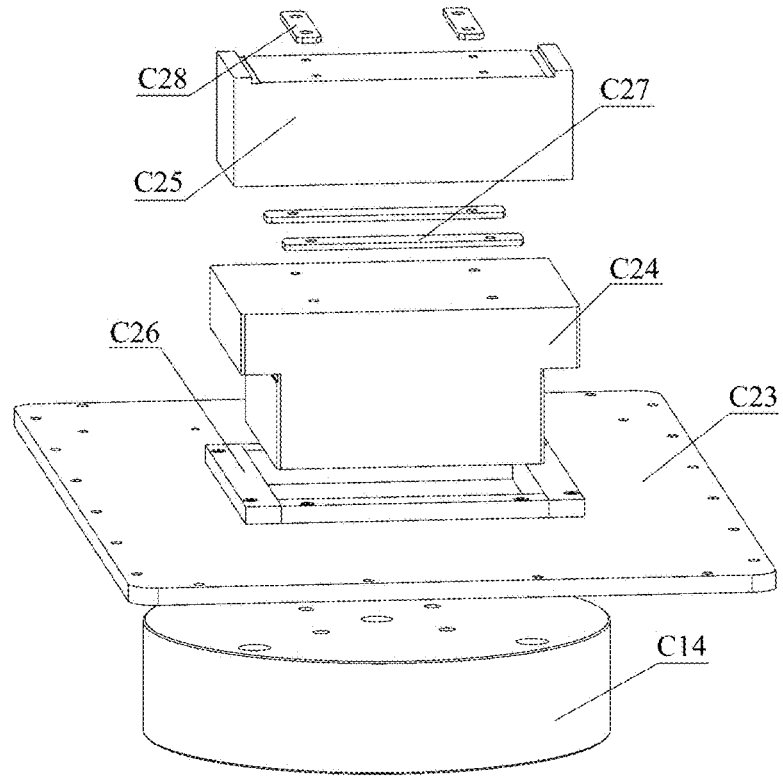
FIG. 16 shows an explosive diagram of a second middle principal stress direction support and force transmission assembly of the present invention.

As shown in FIGS. 2 to 4, the low-frequency disturbance true triaxial mechanism I comprises a true triaxial loading assembly and a parallel oil source assembly, and the true triaxial loading assembly and the parallel oil source assembly are both mounted on a mechanism base A1.

The true triaxial loading assembly comprises a rigid base A2, a horizontal rigid framework body A3, a vertical rigid framework body A4, a cast iron vibration damping platform A5 and six servo hydraulic dynamic actuators A6. When actuators are the servo hydraulic dynamic actuators A6, a static loading effect can be achieved, and a dynamic loading effect can also be achieved. The cast iron vibration damping platform A5 is horizontally and fixedly mounted on the mechanism base A1, the rigid base A2 is horizontally clamped and mounted on the cast iron vibration damping platform A5, and the vertical rigid framework body A4 is vertically screwed and fixed to an upper surface of the rigid base A2, and the vertical rigid framework body A4 consists of a top plate, a bottom plate and four upright posts. The horizontal rigid framework body A3 is an annular structure, is sleeved on an outer side of the vertical rigid framework body A4, and is screwed and fixed to the upper surface of the rigid base A2. Two servo hydraulic dynamic actuators A6 are respectively mounted on the top plate and the bottom plate of the vertical rigid framework body A4, and the two servo hydraulic dynamic actuators A6 on the top plate and the bottom plate of the vertical rigid framework body A4 are in symmetrical distribution. Four servo hydraulic dynamic actuators A6 are uniformly distributed and mounted on the horizontal rigid framework body A3 in a circumferential direction. A reversing valve block (not shown) is assembled on each servo hydraulic dynamic actuator A6, a dynamic load sensor (now shown) is assembled at one end of a piston rod (now shown) of each servo hydraulic dynamic actuator A6, and the piston rod of each servo hydraulic dynamic actuator A6 is a hollow rod structure. The hollow rod structure not only can reduce the inertia of the piston rod but also can increase the dynamic corresponding characteristics of the actuators, and besides, the piston rod can be used as an incident passage of an incident rod B5 during variable-frequency low-speed disturbance tests.

The parallel oil source assembly comprises an oil tank A7, a pump station A8 and coolers A9. An inner cavity of the oil tank A7 is divided into six regions by baffle plates, and the six regions are respectively defined as a No. 1 region A10, a No. 2 region A11, a No. 3 region A12, a No. 4 region A13, a No. 5 region A14 and a No. 6 region A15. A top part of the No. 1 region A10, a top part of the No. 2 region A11 and a top part of the No. 3 region A12 are in mutual communication, a top part of the No. 4 region A13 and a top part of the No. 5 region A14 are in mutual communication, a bottom part of the No. 5 region A14 and a bottom part of the No. 6 region A15 are in mutual communication, the top part of the No. 1 region A10 and the top part of the No. 4 region A13 are in mutual communication, the top part of the No. 2 region A11 and the top part of the No. 5 region A14 are in mutual communication, and the top part of the No. 3 region A12 and a top part of the No. 6 region A15 are in mutual communication. The pump station A8 comprises five hydraulic pumps which are respectively defined as a first high-flow hydraulic pump A16, a second high-flow hydraulic pump A17, a third high-flow hydraulic pump A18, a fourth high-flow hydraulic pump A19 and a low-flow hydraulic pump A20. In the embodiment, a flow of the first high-flow hydraulic pump A16, the second high-flow hydraulic pump A17, the third high-flow hydraulic pump A18 and the fourth high-flow hydraulic pump A19 is 100 L/min, and a flow of the low-flow hydraulic pump A20 is 30 L/min. The low-flow hydraulic pump A20 of 30 L/min can be used during static tests, and when dynamic tests of 0-20 Hz need to be performed, four high-flow hydraulic pumps of 100 L/min are in parallel connection for realizing flow of 400 L/min. Flow control valves (not shown) are respectively connected to hydraulic oil output ports (not shown) of the first high-flow hydraulic pump A16, the second high-flow hydraulic pump A17, the third high-flow hydraulic pump A18, the fourth high-flow hydraulic pump A19 and the low-flow hydraulic pump A20, the hydraulic oil output ports of the hydraulic pumps are connected to an oil inlet end (not shown) of a flow dividing valve seat A21 through pipelines (not shown), and a front and back cavity oil port (not shown) of each servo hydraulic dynamic actuator A6 is connected to an oil outlet end (not shown) of the flow dividing valve seat A21 through the corresponding reversing valve block and a corresponding pipeline (not shown). Hydraulic oil suction ports (not shown) of the first high-flow hydraulic pump A16, the second high-flow hydraulic pump A17, the third high-flow hydraulic pump A18, the fourth high-flow hydraulic pump A19 and the low-flow hydraulic pump A20 communicate with a bottom part of the inner cavity of the oil tank A7 through pipelines (not shown) to be used for pumping hydraulic oil in the No. 1 region A10, the No. 2 region A11 and the No. 3 region A12. Overflow valves (not shown) are respectively mounted between the hydraulic oil output ports of the first high-flow hydraulic pump A16, the second high-flow hydraulic pump A17, the third high-flow hydraulic pump A18, the fourth high-flow hydraulic pump A19 and the low-flow hydraulic pump A20 and the flow control valves respectively corresponding to the hydraulic oil output ports, and overflow ports of the overflow valves communicate with the No. 4 region A13, the No. 5 region A14 and the No. 6 region A15 through overflow pipelines A22. The first high-flow hydraulic pump A16, the second high-flow hydraulic pump A17, the third high-flow hydraulic pump A18 and the fourth high-flow hydraulic pump A19 are connected to an oil inlet end (not shown) of an oil return valve seat A23 through pipelines (not shown), and an oil outlet end (not shown) of the oil return valve seat A23 communicates with the No. 4 region A13 through a pipeline (not shown). When the first high-flow hydraulic pump A16, the second high-flow hydraulic pump A17, the third high-flow hydraulic pump A18 and the fourth high-flow hydraulic pump A19 are subjected to dynamic disturbance, hydraulic oil flows to the oil inlet end of the oil return valve seat A23 through pipelines. Hot oil output pipelines A24 are connected to the bottom part of the No. 5 region A14, a hot oil hydraulic pump A25 is connected to an oil outlet of each hot oil output pipeline A24, an oil outlet of each hot oil hydraulic pump A25 communicates with the corresponding cooler A9 through a pipeline, hot oil in the No. 5 region A14 is pumped by the hot oil hydraulic pumps A25 into the coolers A9 for temperature reduction, and an oil outlet of each cooler A9 communicates with the bottom part of the No. 6 region A15 through a cold oil return pipeline A26. While cooling hydraulic oil flowing back to the No. 6 region A15 can flow into the No. 3 region A12 communicating with the No. 6 region A15 once again through the top parts of the No. 3 and the No. 6, and further sequentially flow into the No. 2 region A11 and the No. 1 region A10 to finally realize cooling cycle flow of the hydraulic oil and provide continuous power for dynamic disturbance of 0-20 Hz.

As shown in FIGS. 5 to 8, the variable-frequency low-speed disturbance rod mechanism II comprises a launch platform B1, an air cylinder B2, a gun barrel B3, a bullet B4 and an incident rod B5. The gun barrel B3 is horizontally erected on a back side of the launch platform B1, the air cylinder B2 is mounted at a back part of the gun barrel B3, the bullet B4 is located in the gun barrel B3, and a polyethylene antifriction sleeve (not shown) is sleeved on the bullet B4 in the gun barrel B3. Friction force between the gun barrel B3 and the bullet B4 is reduced through the polyethylene antifriction sleeve, and an inner surface of the gun barrel B3 is processed in a boning manner to be used for reducing friction force between the polyethylene antifriction sleeve and the inner surface of the gun barrel B3. The incident rod B5 is horizontally erected on a front side of the launch platform B1 through an incident rod support seat B6. The bullet B4 and the incident rod B5 have two cooperation manners: in a first cooperation manner, the bullet B4 and the incident rod B5 are separately arranged, a polyvinylidene fluoride (PVDF) piezoelectric film sensor (not shown) is mounted on a front end surface of a rod body of the incident rod B5, the front end surface of the rod body of the incident rod B5 is abutted against and in contact with rock specimens (not shown) through the polyvinylidene fluoride (PVDF) piezoelectric film sensor, and a shaping slice (not shown) is mounted on a back end surface of the rod body of the incident rod B5; in a second cooperation manner, a front end surface of the bullet B4 and the back end surface of the rod body of the incident rod B5 are abutted against and in contact with each other, so that the bullet B4 and the incident rod B5 form a lengthened type bullet, a splicing casing pipe B7 is sleeved outside a junction of the bullet B4 and the incident rod B5, the splicing casing pipe B7 can move axially relative to the bullet B4 and the incident rod B5, the front end surface of the rod body of the incident rod B5 and the rock specimens are mutually and separately arranged, the shaping slice is mounted on the front end surface of the rod body of the incident rod B5, and the polyvinylidene fluoride (PVDF) piezoelectric film sensor is mounted on an external surface of the shaping slice. A single pulse mass block B8 is sleeved outside the rod body of the incident rod B5 and is a split combined type structure, an annular groove B30 is formed in a hole wall in an incident rod penetrating and mounting hole of the single pulse mass block B8, an annular boss B31 is arranged on the rod body of the incident rod B5 and is located in the annular groove B30, and an axial thickness of the annular boss B31 is smaller than an axial width of the annular groove B30, so that an incident rod axial fine motion clearance is formed between the annular boss B31 and the annular groove B30. A slide rail B9 is mounted on the launch platform B1 under the single pulse mass block B8, is a parallel double-rail structure, and is parallel to the incident rod B5, a slide block B10 is arranged on the slide rail B9 and is horizontally and fixedly connected to a slide platform B11, and the single pulse mass block B8 is fixedly connected to an upper surface of the slide platform B11 and can move linearly relative to the slide rail B9.

An air compressor B12 and a control console B13 are arranged on a ground at a lateral side of the launch platform B1, a first button switch B14 and a second button switch B15 are arranged on the control console B13, and an air bottle B16, a first pneumatic control valve B17 and a second pneumatic control valve B18 are arranged in the launch platform B1 under the gun barrel B3. The air cylinder B2 is horizontally arranged, a front chamber B19 and a back chamber B20 are arranged in the air cylinder B2, a piston rod B32 of the air cylinder B2 penetrates through a baffle plate between the front chamber B19 of the air cylinder B2 and the back chamber B20 of the air cylinder B2 in a sealed manner, a gun barrel sealing plug B21 is mounted at an end part of the piston rod B32 of the air cylinder B2 located in the front chamber B19 of the air cylinder B2, a launch air outlet B22 is formed in an axial cylinder wall of the front chamber B19 of the air cylinder B2, an air inlet end pipe port at the back part of the gun barrel B3 is in communication with the launch air outlet B22 in a sealed manner, and a launch air inlet B15 is formed in a radial cylinder wall of the front chamber B19 of the air cylinder B2, and is in communication with an air outlet of the air bottle B16 through a launch air inlet pipe B23 in a sealed manner. A piston disc B24 is mounted at an end of the piston rod B32 of the air cylinder B2 located in the back chamber B20 of the air cylinder B2 and divides the back chamber B20 of the air cylinder B2 into a rod cavity and a rodless cavity, and a diameter of the piston disc B24 is greater than that of the gun barrel sealing plug B21. The first button switch B14 and the second button switch B15 have the same structure and both comprises an air inlet, a normally open air outlet, a normally closed air outlet and a pressure relief port. The pressure relief port directly communicates with atmosphere. An air supply port of the air compressor B12 performs output in three paths which are defined as a first path, a second path and a third path, the first path of the air supply port communicates with the air inlet of the first button switch B14, the second path of the air supply port communicates with an air inlet of the first pneumatic control valve B17, and the third path of the air supply port communicates with an air inlet of the air bottle B16. The normally open air outlet of the first button switch B14 communicates with the rodless cavity of the back chamber B20 of the air cylinder B2, the normally closed air outlet of the first button switch B14 communicates with the air inlet of the second button switch B15, the normally open air outlet of the second button switch B15 performs output in two paths which are defined as a first path and a second path, the first path of the normally open air outlet of the second button switch B15 communicates with a valve closing pneumatic control port of the first pneumatic control valve B17, and the second path the normally open air outlet of the second button switch B15 communicates with a valve opening pneumatic control port of the second pneumatic control valve B18. The normally closed air outlet of the second button switch B15 performs output in two paths which are defined as a first path and a second path, the first path of the normally closed air outlet of the second button switch B15 communicates with a valve opening pneumatic control port of the first pneumatic control valve B17, and the second path of the normally closed air outlet of the second button switch B15 communicates with a valve closing pneumatic control port of the second pneumatic control valve B18. An air outlet of the first pneumatic control valve B17 performs output in two paths which are defined as a first path and a second path, the first path of the air outlet of the first pneumatic control valve B17 communicates with an air inlet of the second pneumatic control valve B18, and the second path of the air outlet of the first pneumatic control valve B17 communicates with the rod cavity of the back chamber B20 of the air cylinder B2. An air outlet of the second pneumatic control valve B18 communicates with atmosphere. In the embodiment, the model of the first pneumatic control valve B17 and the second pneumatic control valve B18 is RAT052DA F02/F05-N11, and a working pressure range is 0.3 MPa-0.8 MPa. The model of the first button switch B14 is M5PL210-08, and a working pressure range is 0-1.0 MPa. The model of the second button switch B15 is 4H210-08, and a working pressure range is 0.15 MPa-0.8 MPa.

A vacuum pump B25 is arranged on the ground at the lateral side of the launch platform B1, air exhaust ports are formed in a back-end pipe body of the gun barrel B3 and a middle pipe body of the splicing casing pipe B7, the two air exhaust ports are both connected with the vacuum pump B25, a pipe cavity of the gun barrel B3 and a pipe cavity of the splicing casing pipe B7 are vacuumized through the vacuum pump B25. Through vacuumizing, the bullet B4 in the gun barrel B3 can automatically retreat to a launch position under an action of negative pressure, and through vacuumizing, the bullet B4 in the splicing casing pipe B7 and the incident rod B5 are automatically abutted against and in contact with each other.

A bullet velometer B26 is mounted on the launch platform B1 adjacent to an outlet of the gun barrel B3, and an incident rod velometer B27 is mounted on the launch platform B1 on a front side of the single pulse mass block B8. A charge amplifier B28 is arranged on the ground at the lateral side of the launch platform B1, a signal output end of the polyvinylidene fluoride (PVDF) piezoelectric film sensor is connected with the charge amplifier B28, and a voltage signal of the charge amplifier B28 is connected to an oscillograph or a computer.

An incident rod bearing platform (not shown) is mounted at the lateral side of the launch platform B1, and the incident rod B5 which is not used temporarily is placed on the incident rod bearing platform. A gantry crane B29 is arranged above the launch platform B1, and the incident rod B5 is mounted and disassembled through the gantry crane B29.

As shown in FIGS. 9 to 16, the rapid single-side unloading type specimen box III comprises a framework C1, a framework transfer trolley C2, a specimen limiting box C3, a first maximum principal stress direction support and force transmission assembly C4, a second maximum principal stress direction support and force transmission assembly C5, a first middle principal stress direction support and force transmission assembly C6, a second middle principal stress direction support and force transmission assembly C7, a first minimum principal stress direction support and force transmission assembly C8, a second minimum principal stress direction support and force transmission assembly C9, a maximum principal stress direction specimen deformation measurement assembly C10, a middle principal stress direction specimen deformation measurement assembly C11, a minimum principal stress direction specimen deformation measurement assembly C12 and a pneumatic rapid unloading assembly C13. The framework C1 is a square structure and is placed on the framework transfer trolley C2. The specimen limiting box C3 is located in a center in the framework C1. The first maximum principal stress direction support and force transmission assembly C4 is arranged in a center of a front wall plate of the framework C1, the second maximum principal stress direction support and force transmission assembly C5 is arranged in a center of a back wall plate of the framework C1, and the first maximum principal stress direction support and force transmission assembly C4 and the second maximum principal stress direction support and force transmission assembly C5 are distributed along the same horizontal straight line. The first middle principal stress direction support and force transmission assembly C6 is arranged in a center of a top wall plate of the framework C1, the second middle principal stress direction support and force transmission assembly C7 is arranged in a center of a bottom wall plate of the framework C1, and the first middle principal stress direction support and force transmission assembly C6 and the second middle principal stress direction support and force transmission assembly C7 are distributed along the same vertical straight line. The first minimum principal stress direction support and force transmission assembly C8 is arranged in a center of a left wall plate of the framework C1, the second minimum principal stress direction support and force transmission assembly C9 is arranged in a center of a right wall plate of the framework C1, and the first minimum principal stress direction support and force transmission assembly C8 and the second minimum principal stress direction support and force transmission assembly C9 are distributed along the same horizontal straight line. The maximum principal stress direction specimen deformation measurement assembly C10 is assembled between the first maximum principal stress direction support and force transmission assembly C4 and the second maximum principal stress direction support and force transmission assembly C5. The middle principal stress direction specimen deformation measurement assembly C11 is assembled between the first middle principal stress direction support and force transmission assembly C6 and the second middle principal stress direction support and force transmission assembly C7. The minimum principal stress direction specimen deformation measurement assembly C12 is assembled between the first minimum principal stress direction support and force transmission assembly C8 and the second minimum principal stress direction support and force transmission assembly C9. The pneumatic rapid unloading assembly C13 is assembled between the first minimum principal stress direction support and force transmission assembly C8 and the framework C1.

The specimen limiting box C3 is a rectangular structure and consists of upper and lower half boxes, and the upper and lower half boxes are buckled together to form the complete specimen limiting box C3, and are fixedly connected through bolts. Pressure head passing through holes are respectively formed in six wall surfaces of the specimen limiting box C3.

The first maximum principal stress direction support and force transmission assembly C4, the second maximum principal stress direction support and force transmission assembly C5, the first middle principal stress direction support and force transmission assembly C6 and the second minimum principal stress direction support and force transmission assembly C9 have the same structure and all comprises a disc-shaped bearing cushion block C14, a cylindrical bearing cushion block C15 and a square pressure head C16. The disc-shaped bearing cushion blocks C14 are located outside a wall plate of the framework C1, guide lug plates C17 are uniformly distributed and fixedly arranged on a circumferential edge of each disc-shaped bearing cushion block C14, a guide light hole is formed in each guide lug plate C17, a guide stud C18 is mounted in each guide light hole in a penetrating manner and is fixedly connected to the wall plate of the framework C1, and the disc-shaped bearing cushion blocks C14 can only move axially relative to the guide studs C18. Round cushion block passing through holes are formed in a center of the wall plate of the framework C1, each cylindrical bearing cushion block C15 is mounted in the corresponding round cushion block passing through hole in a penetrating manner, a cushion block radial limiting ring C19 and a cushion block antifriction bearing C20 are sequentially arranged between each round cushion block passing through hole and the corresponding cylindrical bearing cushion block C15, a dustproof loop C21 is sleeved on each cylindrical bearing cushion block C15 on an inner side of the wall plate of the framework C1, and each dustproof loop C21 is fixedly connected to the corresponding cushion block radial limiting ring C19 through a corresponding dustproof loop limiting ring C22. One end of each cylindrical bearing cushion block C15 is abutted against and in contact with the corresponding disc-shaped bearing cushion block C14, the other end of each cylindrical bearing cushion block C15 is abutted against and in contact with one end of the corresponding square pressure head C16, each square pressure head C16 is mounted in the corresponding pressure head passing through hole corresponding to the specimen limiting box C3 in a penetrating manner, and the other end of each square pressure head C16 is abutted against and in contact with specimens in the specimen limiting box C3.

The second middle principal stress direction support and force transmission assembly C7 comprises a disc-shaped bearing cushion block C14, a cushion block support limiting plate C23, a T-shaped bearing cushion block C24, a transition cushion block C25 and a square pressure head C16. The disc-shaped bearing cushion block C14 of the second middle principal stress direction support and force transmission assembly C7 is located under the bottom wall plate of the framework C1, a square cushion block passing through hole is formed in a center of the bottom wall plate of the framework C1, a small head end of the T-shaped bearing cushion block C24 is mounted in the square cushion block passing through hole in a penetrating manner, the disc-shaped bearing cushion block C14 of the second middle principal stress direction support and force transmission assembly C7 is fixedly connected to the small head end of the T-shaped bearing cushion block C24, a large head end of the T-shaped bearing cushion block C24 is located above the bottom wall plate of the framework C1, the cushion block support limiting plate C23 is fixedly mounted on an upper surface of the bottom wall plate of the framework C1, the square cushion block passing through hole is also formed in a center of the cushion block support limiting plate C23, and a cushion block antifriction strip C26 is arranged between the square cushion block passing through hole and the small head end of the T-shaped bearing cushion block C24. The transition cushion block C25 is placed at a top part of the large head end of the T-shaped bearing cushion block C24, and minimum principal stress direction transition cushion block guide limiting strips C27 are arranged at the top part of the large head end of the T-shaped bearing cushion block C24. A lower end of the square pressure head C16 of the second middle principal stress direction support and force transmission assembly C7 is abutted against and in contact with an upper surface of the transition cushion block C25, the square pressure head C16 of the second middle principal stress direction support and force transmission assembly C7 is mounted in the pressure head passing through hole under the specimen limiting box C3 in a penetrating manner, and an upper end of the square pressure head C16 of the second middle principal stress direction support and force transmission assembly C7 is abutted against and in contact with the specimens in the specimen limiting box C3. Maximum principal stress direction square pressure head guide limiting strips C28 are arranged on the upper surface of the transition cushion block C25.

The first minimum principal stress direction support and force transmission assembly C8 comprises a bearing cushion block C29 for unloading, a square pressure head C16 and a protective hood C30. The protective hood C30 takes the place of the wall plate of the framework C1, a bearing cushion block passing through and avoiding hole C31 for unloading is formed in a middle part of the protective hood C30, and the bearing cushion block C29 for unloading is mounted in the bearing cushion block passing through and avoiding hole C31 for unloading in a penetrating manner. One end of the square pressure head C16 of the first minimum principal stress direction support and force transmission assembly C8 is abutted against and in contact with one end of the bearing cushion block C29 for unloading, the square pressure head C16 of the first minimum principal stress direction support and force transmission assembly C8 is mounted in the pressure head passing through hole corresponding to the specimen limiting box C3 in a penetrating manner, and the other end of the square pressure head C16 of the first minimum principal stress direction support and force transmission assembly C8 is abutted against and in contact with the specimens in the specimen limiting box C3.

The maximum principal stress direction specimen deformation measurement assembly C10 comprises maximum principal stress direction sensor brackets C32, a maximum principal stress direction guide rod C33 and a maximum principal stress direction stretching displacement sensor C34. The maximum principal stress direction sensor brackets C32 are respectively and fixedly mounted on the two square pressure heads C16 in a maximum principal stress direction, and the maximum principal stress direction guide rod C33 and the maximum principal stress direction stretching displacement sensor C34 are mounted between the two maximum principal stress direction sensor brackets C32 in parallel. The middle principal stress direction specimen deformation measurement assembly C11 comprises middle principal stress direction sensor brackets C35, a middle principal stress direction guide rod C36 and a middle principal stress direction stretching displacement sensor C37. The middle principal stress direction sensor brackets C35 are respectively and fixedly mounted on the two square pressure heads C16 in a middle principal stress direction, and the middle principal stress direction guide rod C36 and the middle principal stress direction stretching displacement sensor C37 are mounted between the two middle principal stress direction sensor brackets C35 in parallel. The minimum principal stress direction specimen deformation measurement assembly C12 comprises minimum principal stress direction sensor brackets C38 and a minimum principal stress direction stretching displacement sensor C39. The minimum principal stress direction sensor brackets C38 are fixedly mounted on the two square pressure heads C16 in a minimum principal stress direction, and the minimum principal stress direction stretching displacement sensor C39 is mounted between the two minimum principal stress direction sensor brackets C38.

The pneumatic rapid unloading assembly C13 comprises two double-action air cylinders C41, two force transmitting brackets C42, a buffer block C43, a buffer spring C44 and a buffer base C45. The two double-action air cylinders C41 are symmetrically distributed on two sides of the bearing cushion block C29 for unloading. The double-action air cylinders C41 are vertically arranged, piston rods of the double-action air cylinders C41 are upwards, end parts of the piston rods of the double-action air cylinders C41 are respectively hinged to the force transmitting bracket C42, the force transmitting brackets C42 are fixedly connected to the bearing cushion block C29 for unloading, and cylinder barrel end parts of the double-action air cylinders C41 are connected to the framework C1 through hinge lug seats C46. The buffer base C45 is located just below the bearing cushion block C29 for unloading, the buffer spring C44 is vertically mounted on an upper surface of the buffer base C45, and the buffer block C43 is mounted at a top part of the buffer spring C44. A guide pin C40 is vertically arranged between the buffer block C43 and the buffer base C45.

In the embodiment, the framework transfer trolley C2 is a plate type structure, a main body of the framework transfer trolley C2 is a framework support plate, limiting blocks for limiting the framework C1 in a horizontal direction and fine adjustment high cushion blocks for adjusting a height of the framework C1 are screwed to four corner points of the framework support plate. Six vehicle wheels are arranged under the framework support plate, and the vehicle wheels comprise two forms. The vehicle wheels in a first form are two cylindrical vehicle wheels, and the vehicle wheels in a second form are four vehicle wheels having V-shaped wheel surfaces. The two cylindrical vehicle wheels are located on the same side, the four vehicle wheels having V-shaped wheel surfaces are located on the same side, the cylindrical vehicle wheels and the vehicle wheels having V-shaped wheel surfaces are distributed on different sides, and two of the four vehicle wheels having V-shaped wheel surfaces form a group. In order that the framework C1 is conveniently hoisted from the framework transfer trolley C2, a dismountable hanging bracket C47 is assembled at a top part of the framework C1, the hanging bracket C47 consists of a hanging bracket vertical plate and four hanging bracket hooks, the four hanging bracket hooks are uniformly distributed at four corner points of the hanging bracket vertical plate, and the hanging bracket vertical plate is fixedly connected with the hanging bracket hooks through bolts. In addition, the whole framework C1 is a split mounting type structure, and a skeleton beam and the wall plate in the framework C1 can be stored after being disassembled, so that the storage space can be effectively saved, and when the skeleton beam and the wall plate need to be used again, the skeleton beam and the wall plate in the disassembled stage are assembled again to form the whole framework C1.

The following is the description of the application process of the true triaxial testing system for disturbance experiment with broadband and low amplitude of a high pressure hard rock of the present invention in combination with the drawings:

Embodiment 1

Static total stress strain loading tests are developed, and firstly, rock specimens having dimensions being 50 mm*50 mm*100 mm are prepared according to the standard of international rock mechanics academy on specimens. Before the tests, specimen assembly needs to be performed outside a true triaxial testing machine, firstly a second middle principal stress direction support and force transmission assembly C7 is assembled in place at the bottom wall plate of the framework C1, then made specimens are enclosed in the specimen limiting box C3, and upper and lower half boxes are fixedly connected together through bolts. The specimen limiting box C3 loaded with the specimens is inserted in one square pressure head C16 of the second middle principal stress direction support and force transmission assembly C7, and the specimen limiting box C3 is preliminarily fixed. Then, the other five square pressure heads C16 are correspondingly inserted in the specimen limiting box C3, then three specimen deformation measurement assemblies are respectively mounted in the three principal stress direction, the other five support and force transmission assemblies except a first minimum principal stress direction support and force transmission assembly C8 are mounted, and finally, the first minimum principal stress direction support and force transmission assembly C8 and a pneumatic rapid unloading assembly C13 are mounted. After mounting of the specimens in the specimen box is finished, firstly a hanging bracket C47 is mounted at the top part of the framework C1 and is used as a hanging point when a crane (not shown) hoists, the whole specimen box is hoisted onto the framework transfer trolley C2 through the crane, then the hanging bracket C47 is removed, the framework transfer trolley C2 is pushed to move along a track until the specimen box enters a loading region of the true triaxial testing machine together with the framework transfer trolley C2, and finally, a height position of the specimen box on the framework transfer trolley C2 is subjected to fine adjustment so that the specimen box is guaranteed to be wholly aligned with three groups of actuators on the true triaxial testing machine. During tests, firstly a low-flow hydraulic pump A20 of 30 L/min is started to provide power for static load, then according to a preset stress path, minimum principal stress is applied to the specimens through a group of actuators in the minimum principal stress direction, middle principal stress is applied to the specimens through a group of actuators in the middle principal stress direction, maximum principal stress is applied to the specimens through a group of actuators in the maximum principal stress direction, a specific preset minimum principal stress is 5 MPa, and a middle principal stress is 20 MPa. The maximum principal stress needs to be increased gradually, besides, in the process of loading the maximum principal stress, firstly the maximum principal stress is loaded at a speed of 1 kN/s, when a plastic deformation region is approached, low-rate deformation control is converted until the specimens are destroyed, and a stress-strain curve of the specimens can be obtained.

Embodiment 2

Surface disturbance tests having frequency being 20 Hz are developed, and firstly rock specimens having dimensions being 50 mm*50 mm*100 mm are prepared according to the standard of international rock mechanics academy on specimens. Before the tests, the specimens are mounted in the specimen box with reference to the embodiment 1. During tests, firstly a low-flow hydraulic pump A20 of 30 L/min is started to provide power for static load, specimen preloading is completed, then according to a preset stress path, minimum principal stress is applied to the specimens through a group of actuators in the minimum principal stress direction, middle principal stress is applied to the specimens through a group of actuators in the middle principal stress direction, maximum principal stress is applied to the specimens through a group of actuators in the maximum principal stress direction, a specific preset minimum principal stress is 5 MPa, and a middle principal stress is 20 MPa. In the process of loading the maximum principal stress, firstly the maximum principal stress is loaded at a speed of 1 kN/s, and when a plastic deformation region is approached, low-rate deformation control is converted till any node of a stress-strain curve. Then, the amplitude and the frequency parameters of dynamic loading force are input into a computer, dynamic load is started, an oil source is switched to a parallel connection pump system of four high-flow hydraulic pumps of 100 L/min so as to output large flow of 400 L/min, dynamic movement of pistons is realized through rapid oil input and output of the large-flow oil source, a dynamic oil cylinder can be in any of three principal stress directions, the pistons in the same direction are used for loading and unloading the specimens at the same time, the amplitude of disturbance is 21 MPa, and the duration time is 5 min. If the specimens are destroyed, a stress-strain curve of the whole specimen destroying process can be obtained. If the specimens are not destroyed, applying disturbance power is stopped, and the maximum principal stress is increased until the specimens are destroyed so as to obtain the stress-strain curve in the whole specimen destroying process.

Embodiment 3

Surface disturbance tests having frequency being 300 Hz are developed to simulate blasting stress waves having frequency being 300 Hz. Firstly rock specimens having dimensions being 50 mm*50 mm*100 mm are prepared according to the standard of international rock mechanics academy on specimens. Before the tests, the specimens are mounted in a specimen box with reference to the embodiment 1, and rigid connection between a rigid base A2 and a cast iron vibration damping platform A5 is relieved so that the rigid base A2 slides freely upwards on a disturbance shaft and cannot move in an axial direction perpendicular to the disturbance shaft. During tests, firstly a low-flow hydraulic pump A20 of 30 L/min is started to provide power for static load, specimen preloading is completed, then according to a preset stress path, minimum principal stress is applied to the specimens through a group of actuators in the minimum principal stress direction, middle principal stress is applied to the specimens through a group of actuators in the middle principal stress direction, maximum principal stress is applied to the specimens through a group of actuators in the maximum principal stress direction, a specific preset minimum principal stress is 5 MPa, and a middle principal stress is 20 MPa. In the process of loading the maximum principal stress, firstly the maximum principal stress is loaded at a speed of 1 kN/s, and when a plastic deformation region is approached, low-rate deformation control is converted till any node of a stress-strain curve.

Because the frequency simulating the blasting stress waves, set in the tests is 300 Hz, a bullet B4 and an incident rod B5 have a first cooperation manner that the bullet B4 and the incident rod B5 are mutually and separately arranged. A length of a gun barrel B3 is 6 m, a length of the incident rod B5 is 9 m, and a material of the incident rod B5 is 42CrMo. Because an elasticity modulus E of the 42CrMo material is 212 GPa and a density $\rho$ of the 42CrMo material is 7850 kg/m$^3$, a calculating formula of wave speed C is that $C=\sqrt{E/\rho}$, and therefore, the wave speed C is 5197 m/s through calculation. For a sine wave having a frequency being 300 Hz, a waveform period $T=\frac{1}{300}=3.33$ ms, so that a pulse duration time t of a half-sine wave is that $t=T/2=1.67$ ms, and through a formula $t=2L/C$, a length L of the bullet B4 is 4.34 m through calculation.

Before tests, the incident rod B5 is hoisted on an incident rod support seat B6, a polyvinylidene fluoride (PVDF) piezoelectric film sensor is mounted on the front end surface of the rod body of the incident rod B5, the front end surface of the rod body of the incident rod B5 is abutted against and in contact with the rock specimens through the polyvinylidene fluoride (PVDF) piezoelectric film sensor, besides, a shaping slice is mounted on the back end surface of the rod body of the incident rod B5, and an original rectangular wave is shaped into the needed half-sine wave through the shaping slice. Then a vacuum pump B25 is started so that the bullet B4 in the gun barrel B3 can automatically retreat to a launch position under the action of negative pressure. Finally, an axial position of the single pulse mass block B8 is adjusted so that a proper incident rod axial fine motion clearance is formed between an annular boss B31 on the incident rod B5 and an annular groove B30 in the single pulse mass block B8. Then, an air cylinder B2 is to be debugged. At an initial state, a first pneumatic control valve B17 is in closed state, a second pneumatic control valve B18 is in opened state. After an air compressor B12 is started, a path of compressed air directly enters an air bottle B16, the other path of the compressed air directly enters the rodless cavity of the back chamber B20 of the air cylinder B2. Along with rise of pressure in the rodless cavity, a piston disc B24, a piston rod B32 and a gun barrel sealing plug B21 are pushed to move to the direction of the gun barrel B3, besides, the rod cavity of the back chamber B20 of the air cylinder B2 is compressed, while air in the rod cavity is discharged into atmosphere through the started second pneumatic control valve B18 until the gun barrel sealing plug B21 is completely abutted again on a launch air outlet B22, the launch air outlet B22 is blocked, and at the time, the gun barrel B3 and the front chamber B19 of the air cylinder B2 realize sealed isolation.

After the gun barrel B3 and the front chamber B19 of the air cylinder B2 complete the sealed isolation, control buttons of a first button switch B14 and a second button switch B15 are pressed down at the same time. At the time, normally open air outlets of the first button switch B14 and the second button switch B15 become the closed state, normally closed air outlets of the first button switch B14 and the second button switch B15 become the opened state at the same time. Compressed air outputted from the air compressor B12 sequentially flows through the first button switch B14 and the second button switch B15 and then flows out from the normally closed air outlet in the opened state of the second button switch B15, while the compressed air flowing out enters the valve opening pneumatic control port of the first pneumatic control valve B17 and the valve closing pneumatic control port of the second pneumatic control valve at the same time in two paths, to further control the first pneumatic control valve B17 to become the opened state from the closed state, and control the second pneumatic control valve B18 to become the closed state from the opened state at the same time.

After conversion between the opened state and closed state of the first pneumatic control valve B17 and the second pneumatic control valve B18 is completed, the compressed air outputted from the air compressor B12 can enter the rod cavity of the back chamber B20 of the air cylinder B2 through the started first pneumatic control valve B17. The diameter of the piston disc B24 is greater than that of the gun barrel sealing plug B21, and under a condition of the same pressure intensity, the piston disc B24 can bear larger axial thrust, so that the piston disc B24 can move in a direction opposite to the gun barrel B3 under an action of axial thrust, air in the rodless cavity of the back chamber B20 of the air cylinder B2 can be exhausted into the atmosphere through the pressure relief port of the first button switch B14. At the same time, along with movement of the piston disc B24, the piston rod B32 and the gun barrel sealing plug B21 are driven to synchronously move in a direction opposite to the gun barrel B3 until the gun barrel sealing plug B21 removes blockage of the launch air outlet B22, the gun barrel B3 recovers to communicate with the front chamber B19 of the air cylinder B2. At the time, air in the air bottle B16 enters the gun barrel B3 through the front chamber B19 of the air cylinder B2, and the bullet B4 in the gun barrel B3 is pushed to launch at preset low air pressure.

After the bullet B4 is launched out from the gun barrel B3, the bullet B4 can directly impact the back end surface of the rod body of the incident rod B5 with the shaping slice. Under an action of the single pulse mass block B8, simulated blasting stress waves having frequency being 300 Hz can directly act on the rock specimens through the incident rod B5 in a form of single pulse. At the time, piezoelectric signals obtained through the polyvinylidene fluoride (PVDF) piezoelectric film sensor are accessed to an oscillograph through a charge amplifier B28, a waveform of the stress waves acting on the rocking specimens in the test can be visually determined through the oscillograph, and the blasting stress waves simulated in the test can be guaranteed to be accurate. Besides, a launching speed of the bullet B4, measured by the bullet velometer B26 is recorded, and the launching speed of the bullet B4 is guaranteed to meet simulation of low stress amplitude characteristics.

In addition, through a debugging process of the air cylinder B2, only the control buttons of the first button switch B14 and the second button switch B15 are pressed down at the same time, the bullet B4 can be launched. If the control button of the first button switch B14 is independently pressed down due to a misoperation, the initial state is that the first pneumatic control valve B17 is in the closed state and the second pneumatic control valve B18 is in the opened state, even if the first button switch B14 is independently triggered to conduct, but the second button switch B15 is still in the non-conducting state, and therefore the conversion between the opened state and the closed state of the first pneumatic control valve B17 and the second pneumatic control valve B18 is not triggered. Similarly, if the control button of the second button switch B15 is independently pressed down due to a misoperation, the initial state is that the first pneumatic control valve B17 is in the closed state and the second pneumatic control valve B18 is in the opened state, even if the second button switch B15 is independently triggered to conduct, but the first button switch B14 is still in the non-conducting state, and therefore, the conversion between the opened state and the closed state of the first pneumatic control valve B17 and the second pneumatic control valve B18 is not triggered either. Therefore, no matter whether the control button of the first button switch B14 or the control button of the second button switch B15 is independently pressed down due to the misoperation, mis-launching of the bullet B4 cannot occur, and finally, the safety of the tests can be improved.

Embodiment 4

Surface disturbance tests having frequency being 100 Hz are developed to simulate blasting stress waves having frequency being 100 Hz. Firstly rock specimens having dimensions being 50 mm*50 mm*100 mm are prepared according to the standard of international rock mechanics academy on specimens. Before the tests, the specimens are mounted in a specimen box with reference to the embodiment 1, and rigid connection between a rigid base A2 and a cast iron vibration damping platform A5 is relieved so that the rigid base A2 slides freely upwards on a disturbance shaft and cannot move in an axial direction perpendicular to the disturbance shaft. During tests, firstly a low-flow hydraulic pump A20 of 30 L/min is started to provide power for static load, specimen preloading is completed, then according to a preset stress path, minimum principal stress is applied to the specimens through a group of actuators in the minimum principal stress direction, middle principal stress is applied to the specimens through a group of actuators in the middle principal stress direction, maximum principal stress is applied to the specimens through a group of actuators in the maximum principal stress direction, a specific preset minimum principal stress is 5 MPa, and a middle principal stress is 20 MPa. In the process of loading the maximum principal stress, firstly the maximum principal stress is loaded at a speed of 1 kN/s, and when a plastic deformation region is approached, low-rate deformation control is converted till any node of a stress-strain curve.

Because the frequency simulating the blasting stress waves, set in the tests is 100 Hz, the bullet B4 and the incident rod B5 have a second cooperation manner of form a lengthened bullet. A length of the gun barrel B3 is 6 m, a length of the incident rod B5 is 9 m, and a material of the incident rod B5 is 42CrMo. Because an elasticity modulus E of the 42CrMo material is 212 GPa and a density ρ of the 42CrMo material is 7850 kg/m³, a calculating formula of wave speed C is that C=√E/ρ, and therefore, the wave speed C is 5197 m/s through calculation. For a sine wave having a frequency being 100 Hz, a waveform period T=1/100=10 ms, so that a pulse duration time t of a half-sine wave is that t=T/2=5 ms, and through a formula t=2 L/C, a length L of the bullet B4 is 13 m through calculation. But, if the bullet B4 of 13 m is tested through the embodiment 3, the incident rod B5 having length being 26 m needs to be independently equipped. At the time, a total length of the bullet B4 and the incident rod B5 reaches 39 m, and it is difficult to have a proper site for mounting the testing equipment of 39 m. Therefore, the second cooperation manner of the bullet B4 and the incident rod B5 is used in the embodiment, a length of the bullet B4 is 4.34 m, that is to say, the bullet B4 existing in the embodiment 3 is directly used but does not need to be made additionally, and the total length of the lengthened bullet formed by the bullet B4 and the incident rod B5 abutted against and in contact with each other is only 13.34 m, so that a floor space of the testing equipment can be effectively saved, and besides, testing requirements can be met.

Before tests, the incident rod B5 is hoisted on the incident rod support seat B6, firstly the shaping slice is mounted on the front end surface of the rod body of the incident rod B5, then the polyvinylidene fluoride (PVDF) piezoelectric film sensor is mounted on the shaping slice, and the polyvinylidene fluoride (PVDF) piezoelectric film sensor is not in contact with the rock specimens. At the time, a splicing casing pipe B7 needs to be used, firstly the splicing casing pipe B7 is sleeved on the bullet B4, then the back end of the incident rod B5 is inserted in the splicing casing pipe B7, then the vacuum pump B25 is started to vacuumize an inner pipe of the splicing casing pipe B7, and under an action of negative pressure, the bullet B4 and the incident rod B5 automatically move towards the middle part of the splicing casing pipe B7 until the bullet B4 and the incident rod B5 automatically complete abutted against and in contact with each other in the splicing casing pipe B7. Finally, the single pulse mass block B8 is mounted, an axial position of the single pulse mass block B8 is adjusted, so that a proper incident rod axial fine motion clearance is formed between the annular boss B31 of the incident rod B5 and the annular groove B30 in the single pulse mass block B8.

Then debugging of the air cylinder B2 is completed with reference to the embodiment 3 until the whole lengthened bullet is launched out under set low air pressure through the gun barrel B3, and a front end of the lengthened bullet can directly impact the rock specimens and quickly spring back, so that simulated blasting stress waves having frequency being 100 Hz can directly act on the rock specimens for tests. At the time, piezoelectric signals obtained through the polyvinylidene fluoride (PVDF) piezoelectric film sensor are accessed to the oscillograph through the charge amplifier B28, a waveform of the stress waves acting on the rocking specimens in the test can be visually determined through the oscillograph, and the blasting stress waves simulated in the test can be guaranteed to be accurate. Besides, a launching speed of the lengthened bullet, measured by an incident rod velometer B27 is recorded, and the launching speed of the lengthened bullet is guaranteed to meet simulation of low stress amplitude characteristics.

Embodiment 5

Rock burst tests are performed, and firstly rock specimens having dimensions being 50 mm*50 mm*100 mm are prepared according to the standard of international rock mechanics academy on specimens. Before the tests, the specimens are mounted in the specimen box with reference to the embodiment 1. During tests, firstly a low-flow hydraulic pump A20 of 30 L/min is started to provide power for static load, then according to a preset stress path, minimum principal stress is applied to the specimens through a group of actuators in the minimum principal stress direction, middle principal stress is applied to the specimens through a group of actuators in the middle principal stress direction, maximum principal stress is applied to the specimens through a group of actuators in the maximum principal stress direction, a specific preset minimum principal stress is 5 MPa, and a middle principal stress is 20 MPa. In the process of loading the maximum principal stress, firstly the maximum principal stress is loaded at a speed of 1 kN/s, and when a plastic deformation region is approached, low-rate deformation control is converted until any node of a stress-strain curve. When the maximum principal stress is increased to the maximum principal stress value of original rocks, piston rods of the double-action air cylinders C41 are controlled to quickly retreat, further the bearing cushion block C29 for unloading rapidly separates between the actuators and the square pressure heads C16 and drops out on the buffer block C43, and besides, buffer is realized through compression of the buffer spring C44. Then the maximum principal stress is continued to be increased until the specimens generate rock burst, or when the maximum principal stress is increased, disturbance of different frequencies is applied until the specimens generate rock burst.

The scheme in the embodiments is not intended to limit the scope of patent protection of the invention, and any equivalent implementation or change that is not separated from the invention is included in the scope of the patent in the case.

What is claimed is:

1. A true triaxial testing system for disturbance experiment with broadband and low amplitude of a high pressure hard rock, comprising a low-frequency disturbance true triaxial mechanism, a variable-frequency low-speed disturbance rod mechanism and a rapid single-side unloading type specimen box; wherein the low-frequency disturbance true triaxial mechanism and the variable-frequency low-speed disturbance rod mechanism are distributed on the same straight line, the low-frequency disturbance true triaxial mechanism is independently used or cooperates with the variable-frequency low-speed disturbance rod mechanism for use, and the rapid single-side unloading type specimen box cooperates with the low-frequency disturbance true triaxial mechanism for use;

wherein the low-frequency disturbance true triaxial mechanism comprises a true triaxial loading assembly and a parallel oil source assembly; wherein the true triaxial loading assembly and the parallel oil source assembly are both mounted on a mechanism base; wherein the true triaxial loading assembly comprises a rigid base, a horizontal rigid framework body, a vertical rigid framework body, a cast iron vibration damping platform and six servo hydraulic dynamic actuators; wherein the cast iron vibration damping platform is horizontally and fixedly mounted on the mechanism base, the rigid base is horizontally clamped and mounted on the cast iron vibration damping platform, and the vertical rigid framework body is vertically screwed and fixed to an upper surface of the rigid base, and the vertical rigid framework body consists of a top plate, a bottom plate and four upright posts; wherein the horizontal rigid framework body is an annular structure, is sleeved on an outer side of the vertical rigid framework body, and is screwed and fixed to the upper surface of the rigid base; wherein two servo hydraulic dynamic actuators are respectively mounted on the top plate and the bottom plate of the vertical rigid framework body, and the two servo hydraulic dynamic actuators on the top plate and the bottom plate of the vertical rigid framework body are in symmetrical distribution; wherein four servo hydraulic dynamic actuators are uniformly distributed and mounted on the horizontal rigid framework body in a circumferential direction; and wherein a reversing valve block is assembled on each servo hydraulic dynamic actuator, a dynamic load sensor is assembled at one end of a piston rod of each servo hydraulic dynamic actuator, and the piston rod of each servo hydraulic dynamic actuator is a hollow rod structure; and wherein the parallel oil source assembly comprises an oil tank, a pump station and coolers; wherein an inner cavity of the oil tank is divided into six regions by baffle plates, and the six regions are respectively defined as a No. 1 region, a No. 2 region, a No. 3 region, a No. 4 region, a No. 5 region and a No. 6 region; wherein a top part of the No. 1 region, a top part of the No. 2 region and a top part of the No. 3 region are in mutual communication, a top part of the No. 4 region and a top part of the No. 5 region are in mutual communication, a bottom part of the No. 5 region and a bottom part of the No. 6 region are in mutual communication, the top part of the No. 1 region and the top part of the No. 4 region are in mutual communication, the top part of the No. 2 region and the top part of the No. 5 region are in mutual communication, and the top part of the No. 3 region and a top part of the No. 6 region are in mutual communication; wherein the pump station comprises five hydraulic pumps which are respectively defined as a first high-flow hydraulic pump, a second high-flow hydraulic pump, a third high-flow hydraulic pump, a fourth high-flow hydraulic pump and a low-flow hydraulic pump; wherein a flow control valve is connected to a hydraulic oil output port of each of the five hydraulic pumps, the hydraulic oil output ports of the hydraulic pumps are connected to an oil inlet end of a flow dividing valve seat through pipelines, and a front and back cavity oil port of each servo hydraulic dynamic actuator is connected to an oil outlet end of the flow dividing valve seat through the corresponding reversing valve block and a corresponding pipeline; wherein hydraulic oil suction ports of the first high-flow hydraulic pump, the second high-flow hydraulic pump, the third high-flow hydraulic pump, the fourth high-flow hydraulic pump and the low-flow hydraulic pump communicate with a bottom part of the inner cavity of the oil tank through pipelines to be used for pumping hydraulic oil in the No. 1 region, the No. 2 region and the No. 3 region; wherein overflow valves are respectively mounted between the hydraulic oil output ports of the first high-flow hydraulic pump, the second high-flow hydraulic pump, the third high-flow hydraulic pump, the fourth high-flow hydraulic pump and the low-flow hydraulic pump and the flow control valves respectively corresponding to the hydraulic oil output ports, and overflow ports of the overflow valves communicate with the No. 4 region, the No. 5 region and the No. 6 region through overflow pipelines; wherein the first high-flow hydraulic pump, the second high-flow hydraulic pump, the third high-flow hydraulic pump and the fourth high-flow hydraulic pump are connected to an oil inlet end of an oil return valve seat through pipelines, and an oil outlet end of the oil return valve seat communicates with the No. 4 region through a pipeline; wherein when the first high-flow hydraulic pump, the second high-flow hydraulic pump, the third high-flow hydraulic pump and the fourth high-flow hydraulic pump are subjected to dynamic disturbance, hydraulic oil flows to the oil inlet end of the oil return valve seat through pipelines; and wherein hot oil output pipelines are connected to the bottom part of the No. 5 region, a hot oil hydraulic pump is connected to an oil outlet of each hot oil output pipeline, an oil outlet of each hot oil hydraulic pump communicates with the corresponding cooler through a pipeline, hot oil in the No. 5 region is pumped by the hot oil hydraulic pumps into the coolers for temperature reduction, and an oil outlet of each cooler communicates with the bottom part of the No. 6 region through a cold oil return pipeline.

2. The system according to claim 1, wherein the variable-frequency low-speed disturbance rod mechanism comprises a launch platform, an air cylinder, a gun barrel, a bullet and an incident rod; wherein the gun barrel is horizontally erected on a back side of the launch platform, the air cylinder is mounted at a back part of the gun barrel, the bullet is located in the gun barrel, and a polyethylene antifriction sleeve is sleeved on the bullet in the gun barrel; wherein the incident rod is horizontally erected on a front side of the launch platform through an incident rod support seat; wherein the bullet and the incident rod have two cooperation manners: in a first cooperation manner, the bullet and the incident rod are separately arranged, a polyvinylidene fluoride (PVDF) piezoelectric film sensor is mounted on a front end surface of a rod body of the incident rod, the front end surface of the rod body of the incident rod is abutted against and in contact with rock specimens through the polyvinylidene fluoride (PVDF) piezoelectric film sensor, and a shaping slice is mounted on a back end surface of the rod body of the incident rod; in a second cooperation manner, a front end surface of the bullet and the back end surface of the rod body of the incident rod are abutted against and in contact with each other, so that the bullet and the incident rod form a lengthened type bullet, a splicing casing pipe is sleeved outside a junction of the bullet and the incident rod, the splicing casing pipe can move axially relative to the bullet and the incident rod, the front end surface of the rod body of the incident rod and the rock specimens are mutually separately arranged, the shaping slice is mounted on the front end surface of the rod body of the incident rod, and the polyvinylidene fluoride (PVDF) piezoelectric film sensor is mounted on an external surface of the shaping slice; wherein a single pulse mass block is sleeved outside the rod body of the incident rod and is a split combined type structure, an annular groove is formed in a hole wall in an incident rod penetrating and mounting hole of the single pulse mass block, an annular boss is arranged on the rod body of the incident rod and is located in the annular groove, and an axial thickness of the annular boss is smaller than an axial width of the annular groove, so that an incident rod axial fine motion clearance is formed between the annular boss and the annular groove; and wherein a slide rail is mounted on the launch platform under the single pulse mass block, is a parallel double-rail structure, and is parallel to the incident rod, a slide block is arranged on the slide rail and is horizontally and fixedly connected to a slide platform, and the single pulse mass block is fixedly connected to an upper surface of the slide platform and can move linearly relative to the slide rail.

3. The system according to claim 2, wherein an air compressor and a control console are arranged on a ground at a lateral side of the launch platform, a first button switch and a second button switch are arranged on the control console, and an air bottle, a first pneumatic control valve and a second pneumatic control valve are arranged in the launch platform under the gun barrel; wherein the air cylinder is horizontally arranged, a front chamber and a back chamber are arranged in the air cylinder, a piston rod of the air cylinder penetrates through a baffle plate between the front chamber of the air cylinder and the back chamber of the air cylinder in a sealed manner, a gun barrel sealing plug is mounted at an end part of the piston rod of the air cylinder located in the front chamber of the air cylinder, a launch air outlet is formed in an axial cylinder wall of the front chamber of the air cylinder, an air inlet end pipe port at a back part of the gun barrel is in communication with the launch air outlet in a sealed manner, and a launch air inlet is formed in a radial cylinder wall of the front chamber of the air cylinder, and is in communication with an air outlet of the air bottle through a launch air inlet pipe in a sealed manner; wherein a piston disc is mounted at an end of the piston rod of the air cylinder located in the back chamber of the air cylinder and divides the back chamber of the air cylinder into a rod cavity and a rodless cavity, and a diameter of the piston disc is greater than that of the gun barrel sealing plug; wherein the first button switch and the second button switch have the same structure and both comprises an air inlet, a normally open air outlet, a normally closed air outlet and a pressure relief port; wherein the pressure relief port directly communicates with atmosphere; wherein an air supply port of the air compressor performs output in three paths which are defined as a first path, a second path and a third path, the first path of the air supply port communicates with the air inlet of the first button switch, the second path of the air supply port communicates with an air inlet of the first pneumatic control valve, and the third path of the air supply port communicates with an air inlet of the air bottle; wherein the normally open air outlet of the first button switch communicates with the rodless cavity of the back chamber of the air cylinder, the normally closed air outlet of the first button switch communicates with the air inlet of the second button switch, the normally open air outlet of the second button switch performs output in two paths which are defined as a first path and a second path, the first path of the normally open air outlet of the second button switch communicates with a valve closing pneumatic control port of the first pneumatic control valve, and the second path of the normally open air outlet of the second button switch communicates with a valve opening pneumatic control port of the second pneumatic control valve; wherein the normally closed air outlet of the second button switch performs output in two paths which are defined as a first path and a second path, the first path of the normally closed air outlet of the second button switch communicates with a valve opening pneumatic control port of the first pneumatic control valve, and the second path of the normally closed air outlet of the second button switch communicates with a valve closing pneumatic control port of the second pneumatic control valve; wherein an air outlet of the first pneumatic control valve performs output in two paths which are defined as a first path and a second path, the first path of the air outlet of the first pneumatic control valve communicates with an air inlet of the second pneumatic control valve, and the second path of the air outlet of the first pneumatic control valve communicates with the rod cavity of the back chamber of the air cylinder; and wherein an air outlet of the second pneumatic control valve communicates with atmosphere.

4. The system according to claim 3, wherein a vacuum pump is arranged on the ground at the lateral side of the launch platform, air exhaust ports are formed in a back-end pipe body of the gun barrel and a middle pipe body of the splicing casing pipe, the two air exhaust ports are both connected with the vacuum pump, a pipe cavity of the gun barrel and a pipe cavity of the splicing casing pipe are vacuumized through the vacuum pump; wherein through vacuumizing, the bullet in the gun barrel can automatically retreat to a launch position under an action of negative pressure, and through vacuumizing, the bullet in the splicing casing pipe and the incident rod are automatically abutted against and in contact with each other; wherein a bullet velometer is mounted on the launch platform adjacent to an outlet of the gun barrel, and an incident rod velometer is mounted on the launch platform on a front side of the single pulse mass block; wherein a charge amplifier is arranged on the ground at the lateral side of the launch platform, a signal output end of the polyvinylidene fluoride (PVDF) piezoelectric film sensor is connected with the charge amplifier, and a voltage signal of the charge amplifier is connected to an oscillograph or a computer; wherein an incident rod bearing platform is mounted at the lateral side of the launch platform, and the incident rod which is not used temporarily is placed on the incident rod bearing platform; and wherein a gantry crane is arranged above the launch platform, and the incident rod is mounted and disassembled through the gantry crane.

5. The system according to claim 1, wherein the rapid single-side unloading type specimen box comprises a framework, a framework transfer trolley, a specimen limiting box, a first maximum principal stress direction support and force transmission assembly, a second maximum principal stress direction support and force transmission assembly, a first middle principal stress direction support and force transmission assembly, a second middle principal stress direction support and force transmission assembly, a first minimum principal stress direction support and force transmission assembly, a second minimum principal stress direction support and force transmission assembly, a maximum principal stress direction specimen deformation measurement assembly, a middle principal stress direction specimen deformation measurement assembly, a minimum principal stress direction specimen deformation measurement assembly and a pneumatic rapid unloading assembly; wherein the framework is a square structure and is placed on the framework transfer trolley; wherein the specimen limiting box is located in a center in the framework; wherein the first maximum principal stress direction support and force transmission assembly is arranged in a center of a front wall plate of the framework, the second maximum principal stress direction support and force transmission assembly is arranged in a center of a back wall plate of the framework, and the first maximum principal stress direction support and force transmission assembly and the second maximum principal stress direction support and force transmission assembly are distributed along the same horizontal straight line; wherein the first middle principal stress direction support and force transmission assembly is arranged in a center of a top wall plate of the framework, the second middle principal stress direction support and force transmission assembly is arranged in a center of a bottom wall plate of the framework, and the first middle principal stress direction support and force transmission assembly and the second middle principal stress direction support and force transmission assembly are distributed along the same vertical straight line; wherein the first minimum principal stress direction support and force transmission assembly is arranged in a center of a left wall plate of the framework, the second minimum principal stress direction support and force transmission assembly is arranged in a center of a right wall plate of the framework, and the first minimum principal stress direction support and force transmission assembly and the second minimum principal stress direction support and force transmission assembly are distributed along the same horizontal straight line; wherein the maximum principal stress direction specimen deformation measurement assembly is assembled between the first maximum principal stress direction support and force transmission assembly and the second maximum principal stress direction support and force transmission assembly; wherein the middle principal stress direction specimen deformation measurement assembly is assembled between the first middle principal stress direction support and force transmission assembly and the second middle principal stress direction support and force transmission assembly; wherein the minimum principal stress direction specimen deformation measurement assembly is assembled between the first minimum principal stress direction support and force transmission assembly and the second minimum principal stress direction support and force transmission assembly; and wherein the pneumatic rapid unloading assembly is assembled between the first minimum principal stress direction support and force transmission assembly and the framework.

6. The system according to claim 5, wherein the specimen limiting box is a rectangular structure and consists of upper and lower half boxes, and the upper and lower half boxes are buckled together to form the complete specimen limiting box, and are fixedly connected through bolts; wherein pressure head passing through holes are respectively formed in six wall surfaces of the specimen limiting box; wherein the first maximum principal stress direction support and force transmission assembly, the second maximum principal stress direction support and force transmission assembly, the first middle principal stress direction support and force transmission assembly and the second minimum principal stress direction support and force transmission assembly have the same structure and all comprises a disc-shaped bearing cushion block, a cylindrical bearing cushion block and a square pressure head; wherein the disc-shaped bearing cushion blocks are located outside a wall plate of the framework, guide lug plates are uniformly distributed and fixedly arranged on a circumferential edge of each disc-shaped bearing cushion block, a guide light hole is formed in each guide lug plate, a guide stud is mounted in each guide light hole in a penetrating manner and is fixedly connected to the wall plate of the framework, and the disc-shaped bearing cushion blocks can only move axially relative to the guide studs; wherein round cushion block passing through holes are formed in a center of the wall plate of the framework, each cylindrical bearing cushion block is mounted in the corresponding round cushion block passing through hole in a penetrating manner, a cushion block radial limiting ring and a cushion block antifriction bearing are sequentially arranged between each round cushion block passing through hole and the corresponding cylindrical bearing cushion block, a dustproof loop is sleeved on each cylindrical bearing cushion block on an inner side of the wall plate of the framework, and each dustproof loop is fixedly connected to the corresponding cushion block radial limiting ring through a corresponding dustproof loop limiting ring; wherein one end of each cylindrical bearing cushion block is abutted against and in contact with the corresponding disc-shaped bearing cushion block, the other end of each cylindrical bearing cushion block is abutted against and in contact with one end of the corresponding square pressure head, each square pressure head is mounted in the corresponding pressure head passing through hole corresponding to the specimen limiting box in a penetrating manner, and the other end of each square pressure head is abutted against and in contact with specimens in the specimen limiting box; wherein the second middle principal stress direction support and force transmission assembly comprises a disc-shaped bearing cushion block, a cushion block support limiting plate, a T-shaped bearing cushion block, a transition cushion block and a square pressure head; wherein the disc-shaped bearing cushion block of the second middle principal stress direction support and force transmission assembly is located under the bottom wall plate of the framework, a square cushion block passing through hole is formed in a center of the bottom wall plate of the framework, a small head end of the T-shaped bearing cushion block is mounted in the square cushion block passing through hole in a penetrating manner, the disc-shaped bearing cushion block of the second middle principal stress direction support and force transmission assembly is fixedly connected to the small head end of the T-shaped bearing cushion block, a large head end of the T-shaped bearing cushion block is located above the bottom wall plate of the framework, the cushion block support limiting plate is fixedly mounted on an upper surface of the bottom wall plate of the framework, the square cushion block passing through hole is also formed in a center of the cushion block support limiting plate, and a cushion block antifriction strip is arranged between the square cushion block passing through hole and the small head end of the T-shaped bearing cushion block; wherein the transition cushion block is placed at a top part of the large head end of the T-shaped bearing cushion block, and minimum principal stress direction transition cushion block guide limiting strips are arranged at the top part of the large head end of the T-shaped bearing cushion block; wherein a lower end of the square pressure head of the second middle principal stress direction support and force transmission assembly is abutted against and in contact with an upper surface of the transition cushion block, the square pressure head of the second middle principal stress direction support and force transmission assembly is mounted in the pressure head passing through hole under the specimen limiting box in a penetrating manner, and an upper end of the square pressure head of the second middle principal stress direction support and force transmission assembly is abutted against and in contact with the specimens in the specimen limiting box; and wherein maximum principal stress direction square pressure head guide limiting strips are arranged on the upper surface of the transition cushion block.

7. The system according to claim 6, wherein the first minimum principal stress direction support and force transmission assembly comprises a bearing cushion block for unloading, a square pressure head and a protective hood; wherein the protective hood takes the place of the wall plate of the framework, a bearing cushion block passing through and avoiding hole for unloading is formed in a middle part of the protective hood, and the bearing cushion block for unloading is mounted in the bearing cushion block passing through and avoiding hole for unloading in a penetrating manner; wherein one end of the square pressure head of the first minimum principal stress direction support and force transmission assembly is abutted against and in contact with one end of the bearing cushion block for unloading, the square pressure head of the first minimum principal stress direction support and force transmission assembly is mounted in the pressure head passing through hole corresponding to the specimen limiting box in a penetrating manner, and the other end of the square pressure head of the first minimum principal stress direction support and force transmission assembly is abutted against and in contact with the specimens in the specimen limiting box; wherein the maximum principal stress direction specimen deformation measurement assembly comprises maximum principal stress direction sensor brackets, a maximum principal stress direction guide rod and a maximum principal stress direction stretching displacement sensor; wherein the maximum principal stress direction sensor brackets are respectively and fixedly mounted on the two square pressure heads in a maximum principal stress direction, and the maximum principal stress direction guide rod and the maximum principal stress direction stretching displacement sensor are mounted between the two maximum principal stress direction sensor brackets in parallel; wherein the middle principal stress direction specimen deformation measurement assembly comprises middle principal stress direction sensor brackets, a middle principal stress direction guide rod and a middle principal stress direction stretching displacement sensor; wherein the middle principal stress direction sensor brackets are respectively and fixedly mounted on the two square pressure heads in a middle principal stress direction, and the middle principal stress direction guide rod and the middle principal stress direction stretching displacement sensor are mounted between the two middle principal stress direction sensor brackets in parallel; and wherein the minimum principal stress direction specimen deformation measurement assembly comprises minimum principal stress direction sensor brackets and a minimum principal stress direction stretching displacement sensor; wherein the minimum principal stress direction sensor brackets are fixedly mounted on the two square pressure heads in a minimum principal stress direction, and the minimum principal stress direction stretching displacement sensor is mounted between the two minimum principal stress direction sensor brackets.

8. The system according to claim 7, wherein the pneumatic rapid unloading assembly comprises two double-action air cylinders, two force transmitting brackets, a buffer block, a buffer spring and a buffer base; wherein the two double-action air cylinders are symmetrically distributed on two sides of the bearing cushion block for unloading; wherein the double-action air cylinders are vertically arranged, piston rods of the double-action air cylinders are upwards, end parts of the piston rods of the double-action air cylinders are respectively hinged to the force transmitting brackets, the force transmitting brackets are fixedly connected to the bearing cushion block for unloading, and cylinder barrel end parts of the double-action air cylinders are connected to the framework through hinge lug seats; wherein the buffer base is located just below the bearing cushion block for unloading, the buffer spring is vertically mounted on an upper surface of the buffer base, and the buffer block is mounted at a top part of the buffer spring; and wherein a guide pin is vertically arranged between the buffer block and the buffer base.

* * * * *